US012764262B2

(12) United States Patent
Pohl

(10) Patent No.: US 12,764,262 B2
(45) Date of Patent: Oct. 13, 2026

(54) SYSTEMS AND DEVICES FOR CAPTURING IMMERSIVE IMAGES WITH IMPROVED QUALITY

(71) Applicant: immerVR GmbH, Hessdorf (DE)

(72) Inventor: Daniel Pohl, Hessdorf (DE)

(73) Assignee: immerVR GmbH (DE)

( * ) Notice: Subject to any disclaimer, the term of this patent is extended or adjusted under 35 U.S.C. 154(b) by 401 days.

(21) Appl. No.: 18/495,204

(22) Filed: Oct. 26, 2023

(65) Prior Publication Data

US 2024/0155093 A1 May 9, 2024

(51) Int. Cl.

| | |
|---|---|
| ***H04N 13/106*** | (2018.01) |
| ***G06T 7/00*** | (2017.01) |
| ***G06T 7/12*** | (2017.01) |
| ***G06T 7/50*** | (2017.01) |
| ***G06T 7/70*** | (2017.01) |
| ***H04N 23/695*** | (2023.01) |
| *H04N 13/00* | (2018.01) |

(52) U.S. Cl.

CPC ......... *H04N 13/106* (2018.05); *G06T 7/0002* (2013.01); *G06T 7/12* (2017.01); *G06T 7/50* (2017.01); *G06T 7/70* (2017.01); *H04N 23/695* (2023.01); *G06V 2201/07* (2022.01); *H04N 2013/0081* (2013.01)

(58) Field of Classification Search

None

See application file for complete search history.

(56) References Cited

U.S. PATENT DOCUMENTS 11,539,918 B1 * 12/2022 Libin .................. H04L 12/1827
12,307,066 B2 * 5/2025 Sorrentino, III ........ G06F 3/011
2010/0110204 A1 5/2010 Campbell et al.
(Continued)

FOREIGN PATENT DOCUMENTS

DE 10 2018 125 629 A1 5/2019

OTHER PUBLICATIONS

Hamzeh Yazan et al: "A Review of Detection and Removal of Raindrops in Automotive Vision Systems", Journal of Imaging, vol. 7, No. 3, Mar. 10, 2021, p. 52, XP093141650, ISSN: 2313-433X.
(Continued)

*Primary Examiner* — Tahmina N Ansari
(74) *Attorney, Agent, or Firm* — Barnes & Thornburg LLP; Jeffrey R. Stone

(57) ABSTRACT

A device, a system, a camera device, and corresponding methods are provided which allow to capture immersive images with improved quality by providing an assistance to a user. The assistance may be an automatic control and/or feedback-based. A device capable to provide a feedback-based assistance may include one or more processors configured to: receive an image; detect one or more objects within the image; determine, based on the detected one or more objects, whether a quality of the immersive image can be improved using at least one measure; and in the case that it is determined that the quality of the immersive image can be improved using at least one measure, provide control instructions to control one or more output devices to output information informing a user that the at least one measure can improve the quality when capturing an immersive image.

16 Claims, 20 Drawing Sheets

(56) References Cited

U.S. PATENT DOCUMENTS

| | | | |
|---|---|---|---|
| 2011/0187886 A1 | 8/2011 | Nakajima et al. | |
| 2013/0120536 A1 | 5/2013 | Song et al. | |
| 2018/0107886 A1 | 4/2018 | Inamoto et al. | |
| 2019/0015177 A1* | 1/2019 | Elazar | A61C 9/0046 |
| 2019/0108640 A1* | 4/2019 | Zhang | G06T 7/11 |
| 2021/0241505 A1* | 8/2021 | Dryer | G06F 3/011 |
| 2021/0286502 A1* | 9/2021 | Lemay | G06F 3/011 |
| 2024/0103615 A1* | 3/2024 | Huergo Wagner | G06F 3/012 |
| 2024/0155093 A1* | 5/2024 | Pohl | H04N 13/271 |
| 2025/0238114 A1* | 7/2025 | Sorrentino, III | G06F 3/011 |

OTHER PUBLICATIONS

Erich Schneider et al: "EyeSeeCam: an Eye Movement-Driven Head Camera for the Examination of Natural Visual Exploration", Annals of the New York Acedemy of Sciences, New York Academy of Sciences, US, vol. 1164, No. 1, May 21, 2009, pp. 461-467, XP071406359, ISSN: 0077-8923.

Partial European Search Report issued in application No. 23203524.6, dated Apr. 8, 2024.

Extended European Search Report issued in application No. 23204524.6, dated Jul. 1, 2024.

* cited by examiner

350A

350B

350C

350A

350D

350D

SYSTEMS AND DEVICES FOR CAPTURING IMMERSIVE IMAGES WITH IMPROVED QUALITY

CROSS-REFERENCE TO RELATED APPLICATION(S)

This application claims priority to German Patent Application DE 10 2022 128 600.2 filed on Oct. 28, 2022, the entire contents of which are incorporated herein by reference.

TECHNICAL FIELD

Various embodiments generally relate to a device, a system, a (e.g., three-dimensional) camera device, and corresponding methods for capturing immersive images with improved and/or increased quality. To improve, when capturing immersive images, the quality of an immersive image, an assistance is provided which can automatically control settings to improve the quality when capturing an immersive image and/or which can provide feedback to a user on how to improve the quality.

BACKGROUND

Content for computer-simulated reality (such as augmented reality and virtual reality) is represented by immersive media to provide an immersive experience to a user using a dedicated immersive technology system including, for example, a head-mounted display. An immersive medium may, for example, be an immersive image or an immersive video which includes a plurality of immersive images. An immersive image may be rendered by a computer or may be taken (e.g., captured) in the real world using dedicated cameras. In some aspects, computer-rendered features may be added to an immersive image taken in the real world. When taking an immersive image in the real world using dedicated cameras, there may be various issues during taking the immersive image which reduce a quality of the immersive image. Some of these issues may not occur when taking (e.g., classical) two-dimensional images. Therefore, and due to the rise of computer-simulated reality in the consumer market, many users never had such a dedicated camera for taking immersive images and are not aware of these (e.g., immersive image specific) issues which reduce the quality of the immersive image.

SUMMARY

Various aspects relate to a device, a system, a (e.g., three-dimensional) camera device, and corresponding methods which provide an (e.g., automatic and/or feedback-based) assistance for improving the quality of an immersive image when capturing the immersive image. For example, the device, the system, the (e.g., three-dimensional) camera device, and the corresponding methods are capable to detect (e.g., when taking immersive images) issues reducing the quality of an immersive image (to be taken or already taken) and to provide a corresponding assistance (e.g., guidance). The assistance may automatically control one or more settings (e.g., of the (e.g., three-dimensional) camera device) and/or may provide a feedback to a user (who is capturing the immersive image) on how the detected issues might be solved. In the latter (feedback-based) case, the assistance may inform the user on how to take an immersive image having improved quality.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details, and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments. Various embodiments are described in connection with methods and various embodiments are described in connection with devices. However, it may be understood that embodiments described in connection with methods may similarly apply to the devices, and vice versa.

Content for computer-simulated reality may be represented by immersive images which are taken in the real world using dedicated (three-dimensional) camera devices. However, there may be various issues which could occur during taking an immersive image and which would then reduce a quality of the immersive image. Various aspects relate to a device, a system, a (e.g., three-dimensional) camera device, and corresponding methods which provide an (e.g., automatic and/or feedback-based) assistance for improving the quality of the immersive image. According to various aspects, the assistance may inform a user on how improve the quality when taking an immersive image. Also, according to some aspects, the assistance may (with or without providing feedback to the user) automatically control the (e.g., three-dimensional) camera device to improve the quality when taking an immersive image (e.g., by controlling a focus of the (e.g., three-dimensional) camera device).

Capturing immersive images with improved quality also leads to an increased computer-simulated immersive experience of the user when using such immersive images of improved quality. Various aspects relate to a method which allows to further increase the immersive experience of the user by user-specifically selecting immersive images such that properties of the immersive images are in accordance with one or more (e.g., physical) body characteristics (may also be referred to as body features) of the user (e.g., a height of the user and/or an interpupillary distance of the user).

Figure 1A:
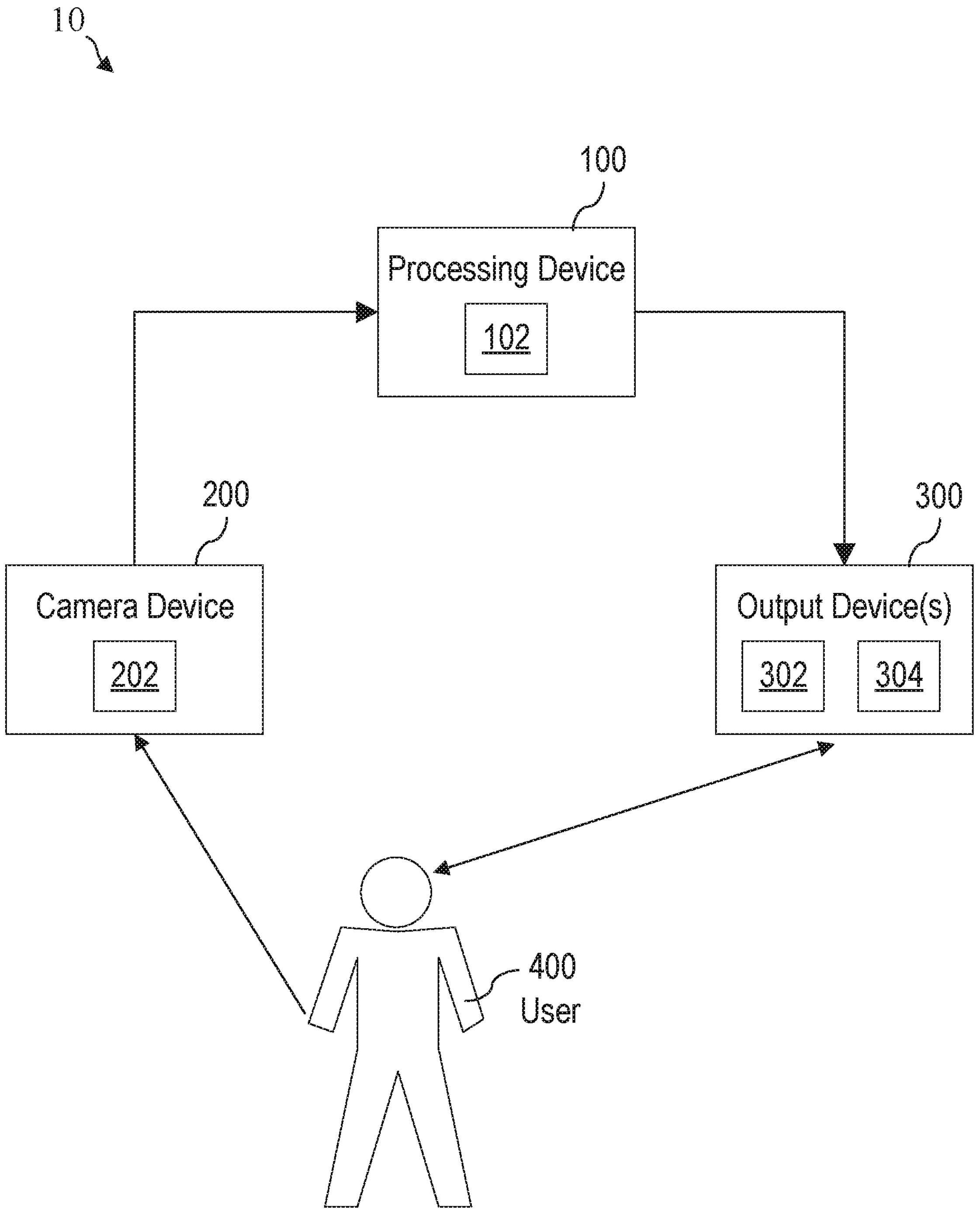
FIG. 1A to FIG. 1E show a system for obtaining an immersive image having improved quality, according to various aspects.

FIG. 1A to FIG. 1E show a system 10 for obtaining an immersive image having improved quality according to various aspects. As shown in FIG. 1A, the system 10 may include a processing device 100 (short device 100). The processing device 100 may include one or more processors 102. The system 10 may include a camera device 200 (may also be referred to as VR camera or VR camera device) for capturing immersive images. The camera device 200 may be configured to capture stereoscopic and/or monoscopic immersive images. In some aspects, the camera device 200 may be a three-dimensional (3D) camera device configured to capture stereoscopic immersive images. In other aspects, the camera device 200 may be configured to capture monoscopic immersive images. The processing device 100 may be communicatively coupled to the (e.g., 3D) camera device 200. The processing device 100 may be communicatively coupled to the one or more output devices 300. Optionally, the (e.g., 3D) camera device 200 may be communicatively coupled to the one or more output devices 300. In the case that a first device and a second device may be communicatively coupled to each other, there may be a wired (e.g., in the case that they are part of the same device) and/or wireless connection between them. This wired and/or wireless connection may be any suitable connection for transferring data. For example, the wireless connection may be a long-range network connection (e.g., a cellular network connection) and/or a short-range network connection (e.g., a Bluetooth connection, a wireless local area network (WLAN) connection, etc.). Various aspects relate to providing data (e.g., an image, control instructions, etc.) from one device to another device; it is understood that the devices may be connected to each other via any suitable kind of network. This connection may be direct (e.g., in the case of a Bluetooth connection) or may be indirect (e.g., via a WLAN router, a cloud server, etc.).

The (e.g., 3D) camera device 200 may include one or more cameras 202. The one or more cameras 202 may be configured to capture an immersive image. The (e.g., 3D) camera device 200 may include one or more input devices (e.g., one or more mechanical buttons, one or more microphone (for voice-control), and/or one or more touchscreens) which allow a user 400 to initiate capturing an immersive image. The (e.g., 3D) camera device 200 may be configured to provide the captured immersive image to the one or more processors 102 of the processing device 100. It is understood that each camera of the one or more cameras 202 may be associated with a respective camera lens.

Figure 2A:
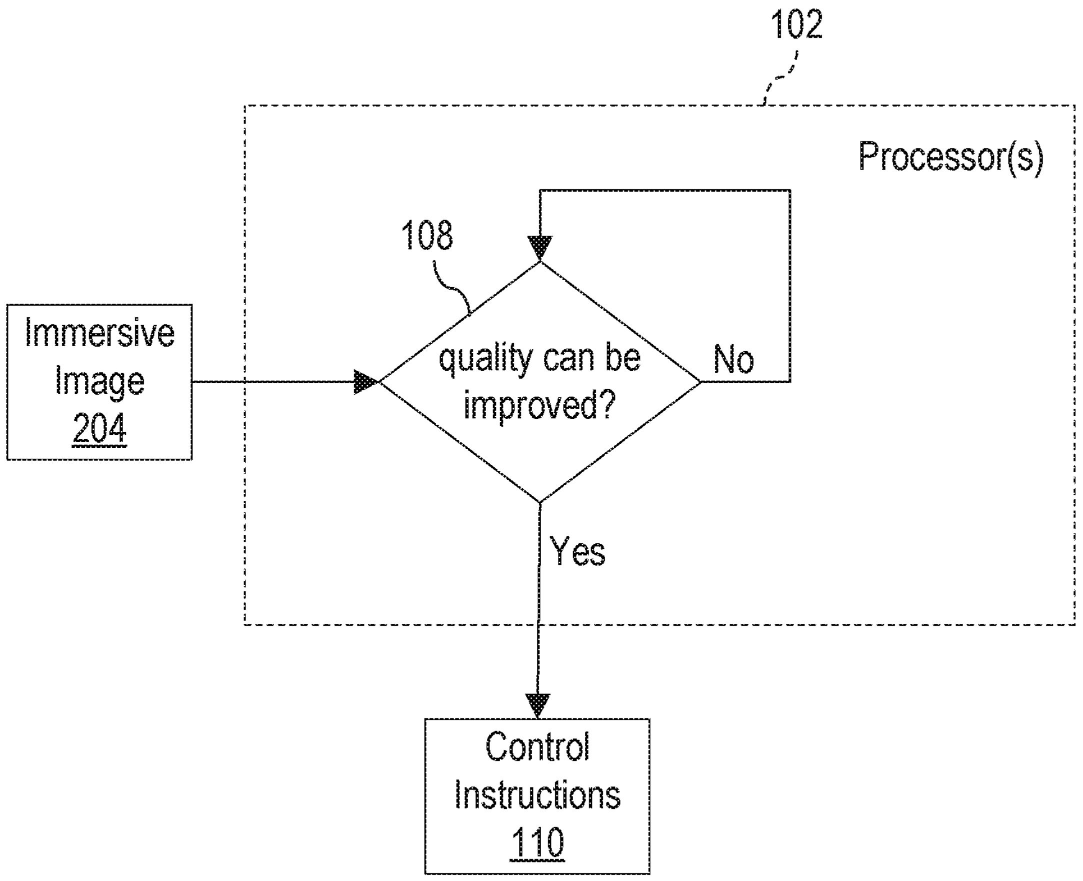
FIG. 2AB and FIG. 2B each show a respective processing flow according to various aspects.
Figure 2B:
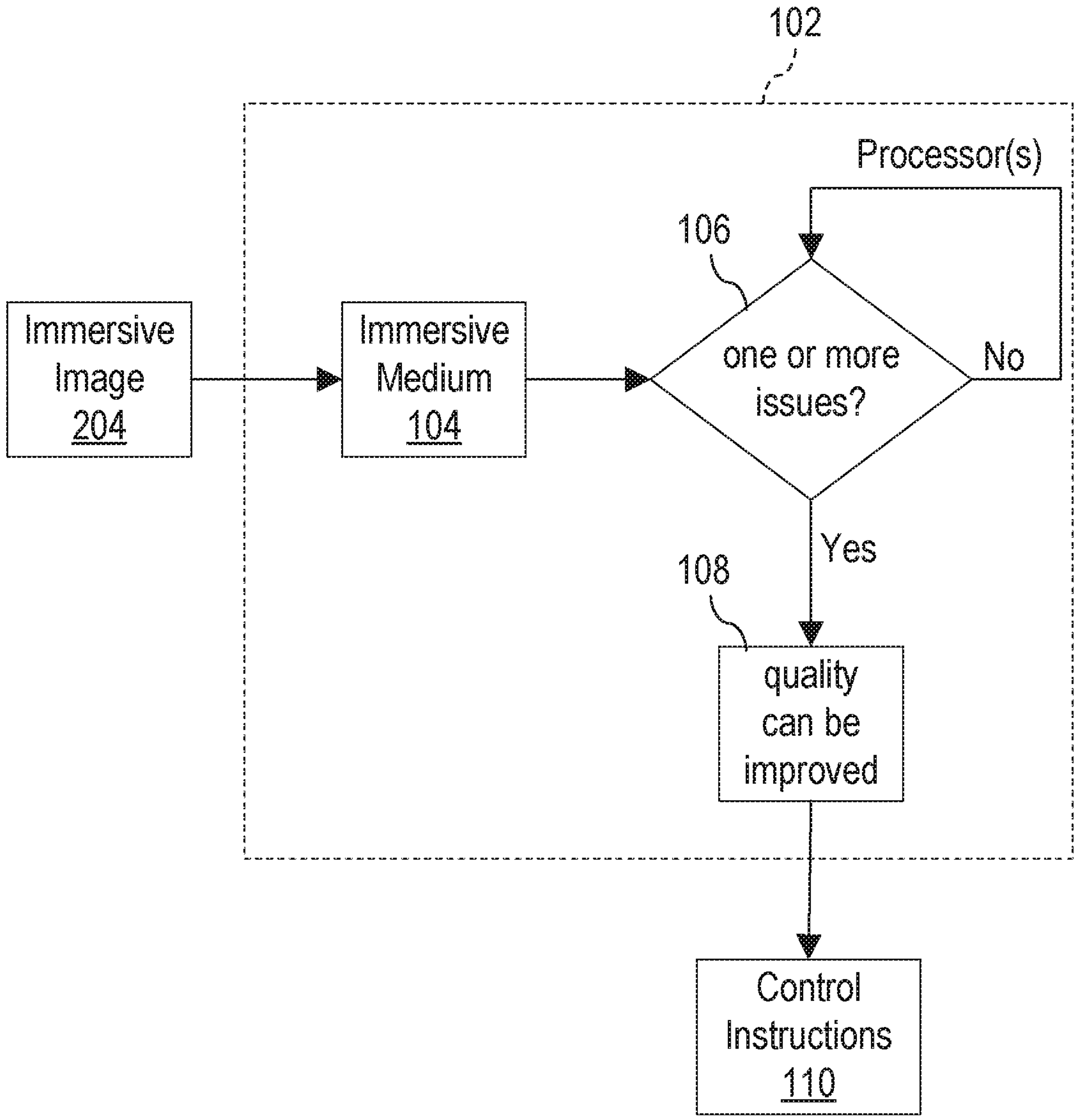

According to various aspects, the one or more processors 102 may be configured to implement an assistance processing scheme (see, for example, FIG. 2A and FIG. 2B). The assistance processing scheme, described herein, is capable to improve the quality when capturing immersive images. The assistance processing scheme may provide an automatic control of the (e.g., 3D) camera device 200. Additionally or alternatively, the assistance processing scheme may be feedback-based and may provide information to the user 400 informing him/her about measures which could improve the quality of immersive images when capturing them. According to various aspects, the system 10 may include one or more output devices 300. For example, the system 10 may include the one or more output devices 300 in the case of a feedback-based assistance. In the case of an automatic control assistance, the one or more output devices 300 may not be necessary (but could be present of course). The one or more output devices 300 may include a display device 302. The display device 302 may be configured to display the information. The one or more output devices 300 may include an audio output device 304 (e.g., including one or more speakers and/or a headphone). The audio output device 304 may be configured to output an audio signal in accordance with the information.

The one or more cameras 202 may be configured to capture a preview (e.g., a preview image) of an immersive image. The (e.g., 3D) camera device 200 may be configured to provide the preview image to the one or more processors 102 of the processing device 100. The display device 302 may be configured to display the preview image (e.g., the one or more processors 102 may be configured to provide control instructions to control the display device 302 to output the preview image). For example, the one or more processors 102 may be configured to receive the preview image from the (e.g., 3D) camera device and to control the display device 302 to display the preview image. The preview image may show a content which would be shown in the immersive image in the case that the immersive image would be captured. However, the preview image may have an image resolution less than the immersive image. Thus, the preview image itself may be unsuitable for providing computer-simulated reality. Illustratively, the preview image may show a current scene in the surrounding of the camera which would be captured by taking the immersive image. The preview image may have a same format as the immersive image to be captured. Hence, the preview image may have an immersive format. According to various aspects, the preview image may be streamed to the display device 302. Hence, the preview image may only be stored temporarily in a buffer memory (whereas the actually captured immersive image may be (e.g., permanently) stored in the memory device)

An immersive image, as described herein, may be any kind of image that allows to display, via a dedicated device, computer-simulated reality content in accordance with the image. Hence, an immersive image may show content which allows to provide computer-simulated reality.

Computer-simulated reality (CR) may be related to any kind of immersive environment. The immersive environment may take place in the physical world with, optionally, information (e.g., objects) added virtually (e.g., the computer-simulated reality may be an augmented reality (AR)). The immersive environment may take place in a virtual world (e.g., the computer-simulated reality may be a virtual reality (VR)). It is understood that the virtual world may show a simulation of real-world content. The immersive environment may take place in both, the physical world and the virtual world (e.g., the computer-simulated reality may be a mixed reality (MR)). The immersive environment may be a combination of AR, VR, and MR (e.g., the computer-simulated reality may be an extended reality (XR)). Thus, the immersive medium 104 may be associated with AR, VR, MR, and/or XR.

An immersive image may represent a specific content of the computer-simulated reality. Herein, various aspects relate to immersive images (e.g., photos) which are taken in the real world. An immersive image may represent a specific area within the computer-simulated reality. This area may be defined by a number of degrees the immersive image fills the computer-simulated reality with content. Illustratively, the area may define how many degrees a user (e.g., user 400) can move his angle of view while still seeing computer-simulated reality content.

In an example, a half-sphere may be filled with content. The phrase "filled with content", as used herein, may describe that a pixel having a pixel value (e.g., different from black) may be present. In this case, the immersive image may represent 180 degrees of content. Illustratively, the user can move his head 90 degrees left and right as well as 90 degrees up and down from a center point and still see computer-simulated reality content. In this case, the immersive image may have a half-spherical format. A half-spherical format may be advantageous over a spherical format in that it is easier to capture the immersive image with a camera without the camera (and/or a camera crew) being seen in the immersive image. For example, a stereoscopic, half-spherical immersive image can be easily created using a camera with two lenses. However, in the case of a half-spherical immersive image, the immersive experience may be lowered by seeing the black area in the other region of the sphere in the case of the user moves his/her head.

In another example, a full-sphere may be filled with content. In this case, the immersive image may represent 360 degrees of content. Illustratively, the user 108 can move his head anywhere and still see computer-simulated reality content. In this case, the immersive image may have a (full-)spherical format. A spherical format may be advantageous over a half-spherical format in that the whole 360 degrees around the user are filled with content improving the immersive experience. However, it may be difficult to capture a 360 degrees immersive image without seeing the at least one of a camera, a tripod, and/or a device for illumination in the image. The 360 degrees immersive image may be created using stitching which, however, may lead to artifacts and, thus, lower the immersive experience.

The above examples serve as illustration. The content of the computer-simulated reality, as represented by the format of the immersive image, may be associated with any number of degrees (filled with content). According to various aspects, the format of the immersive image may be associated with a content of 70 degrees or greater. For example, the immersive image may have format of 130 degrees (CR130, such as VR130), 140 degrees (CR140, such as VR140), 270 degrees (CR270, such as VR270), etc.

The one or more cameras 202 may be configured to capture immersive images having a predefined number of degrees. As an example, the one or more cameras 202 may be 180° camera(s) configured to captured (half-spherical) immersive images having 180° filled with content. As another example, the one or more cameras 202 may be 360° camera(s) configured to captured (spherical) immersive images having 360° filled with content.

Further, an immersive image may be stereoscopic or monoscopic. In the case of a monoscopic immersive image, the immersive image may include a single image. When providing computer-simulated reality in accordance with the monoscopic immersive image to a user, the single image (hence, the same content) may be provided to the left eye and the right eye of the user. In this case a single camera (of the one or more cameras 202) may be sufficient to capture the monoscopic immersive image.

In the case of a stereoscopic image, the immersive image may include two images from slightly different perspectives. When providing computer-simulated reality in accordance with the stereoscopic immersive image to a user, one of the two images may be provided to the left eye of the user and the other one of the two images may be provided to the right eye of the user (hence, different content may be provided for the left eye and the right eye of the user). In this case at least two cameras (of the one or more cameras 202) may be required to capture the stereoscopic immersive image (i.e., a first camera for capturing one of the two images and a second camera for capturing the other one of the two images).

Even though the stereoscopic image is described with regard to a first camera and a second camera, it is understood that the one or more cameras 202 of the (e.g., 3D) camera device 200 may include more than two cameras (e.g., with overlapping regions). It is also understood that, when a camera is described as left or right, this serves for illustration and the cameras of the one or more cameras 202 may be arranged in any suitable setup configuration (e.g., one over the other). In the case that an image is described as stereoscopic image, the camera device 200 may be a 3D camera device.

According to various aspects, the system 10 may include a memory device for storing captured immersive images.

Figure 3A:
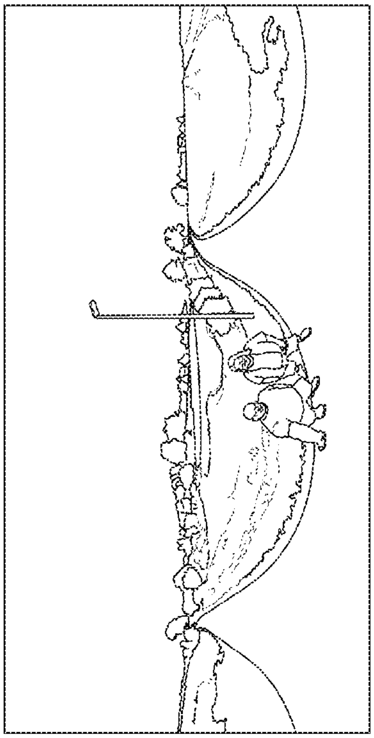
FIG. 3A to FIG. 3C show various exemplary immersive images having different formats.
Figure 3B:
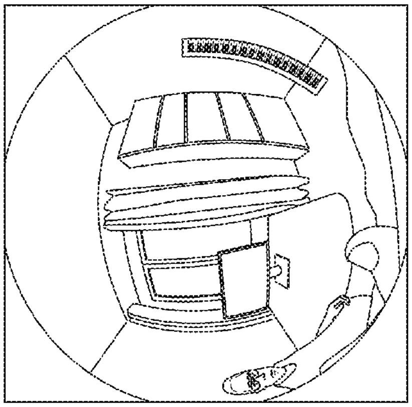
Figure 3C:
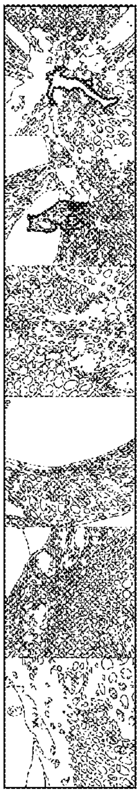

An immersive image may be captured in a predefined format. The immersive image may be stored in the memory device in the predefined format or may be converted into another format prior to storing the immersive image. Examples for formats of an immersive image are an Equirectangular format, a Fisheye format, and a Cubemap format. The immersive image may also have another format (e.g., a Lightfield format). The Equirectangular format is characterized by a map projection in which meridians are mapped to vertical straight lines of constant spacing (e.g., for meridional intervals of constant spacing) and circles of latitude are mapped to horizontal straight lines of constant spacing (e.g., for constant intervals of parallels). The projection is neither equal area nor conformal. Hence, spherical or half-spherical content may be mapped to a rectangle. An exemplary immersive image 350A having the Equirectangular format is shown in FIG. 3A. The Fisheye format is characterized by circular representation. The circle in the center of the image may be filled with content whereas the region outside the circle may be black. A Fisheye format may be, for example, captured using a camera having wide-angle lens(es). An exemplary immersive image 350B having the Fisheye format is shown in FIG. 3B. The Cubemap format is characterized by six images representing six faces of a cube. "Folding" the six images may lead to the cube and a spectator located inside the cube can see the six images providing spherical content of 360 degrees. An exemplary immersive image 350C having the Cubemap format is shown in FIG. 3C. The Lightfield format may allow six degrees-of-freedom within the computer-simulated reality.

Even though various aspects are described herein for images (e.g., immersive images), it is understood that the assistance processing scheme works analogously for (immersive) videos. A video may include a plurality of images within a predefined time period (e.g., 30 frames per second, 60 frames per second, 120 frames per second, etc.). It is noted that any processing of an image described herein may be correspondingly carried out for an image of a video. This processing may be carried out for images of the video at predefined time intervals and/or after a predefined number of images (e.g., every tenth image of the immersive video to name an example) and/or each image associated with a key frame of the video.

As described with reference to FIG. 1A, the system 10 may include the processing device 100, the (e.g., 3D) camera device 200, and the one or more output devices 300.

According to some aspects, the processing device 100, the (e.g., 3D) camera device 200, and the one or more output devices 300 may be separate devices or be part of separate devices. As an example, the (e.g., 3D) camera device 200 may be a (e.g., commercially available) VR camera, the processing device 100 may be a cloud processing device, and the one or more output devices 300 may be or may be part of a user device (e.g., a smartphone, a tablet, a home assistant (e.g., in the case of the audio output device 304), etc.).

Figure 1B:
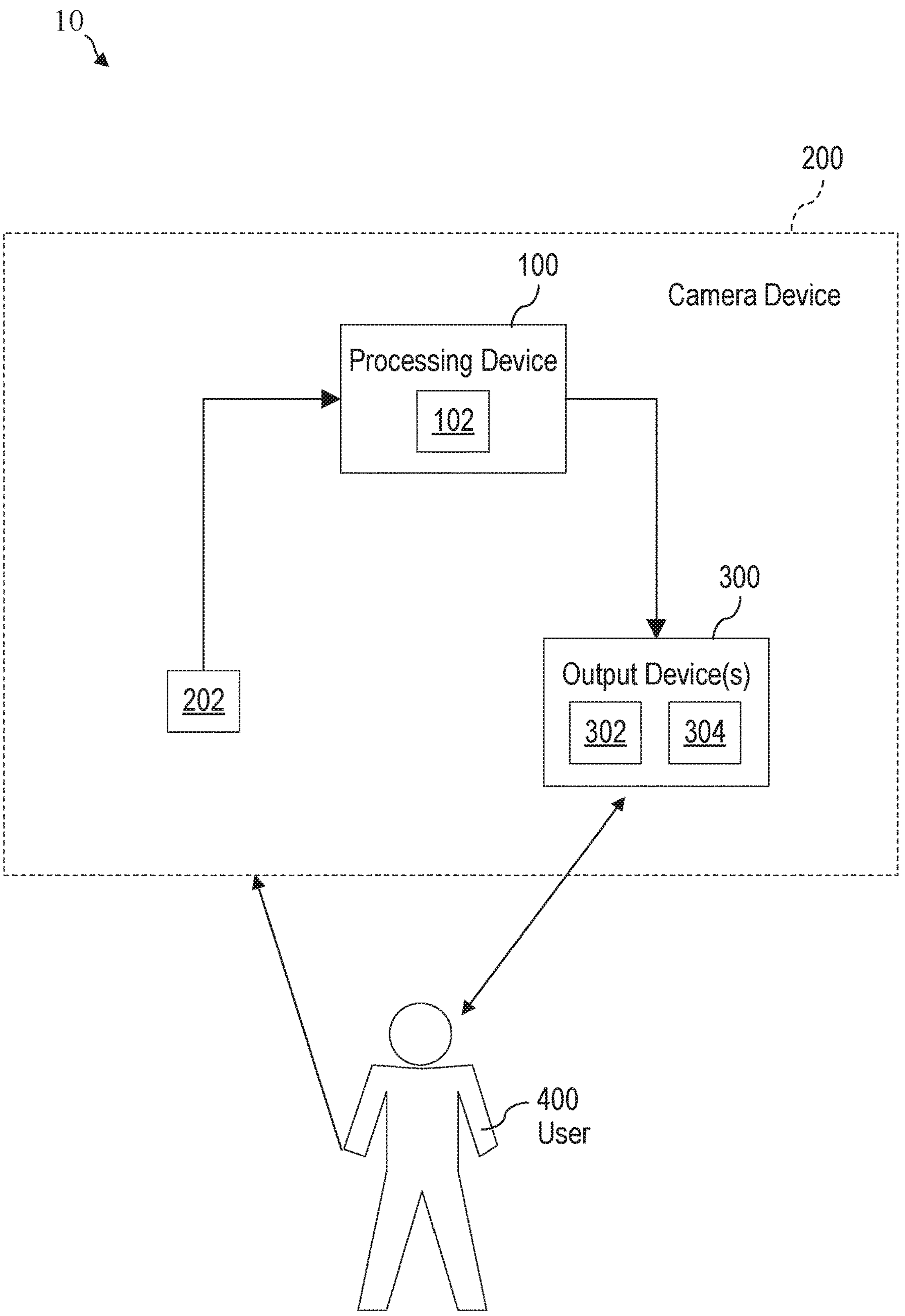
Figure 1C:
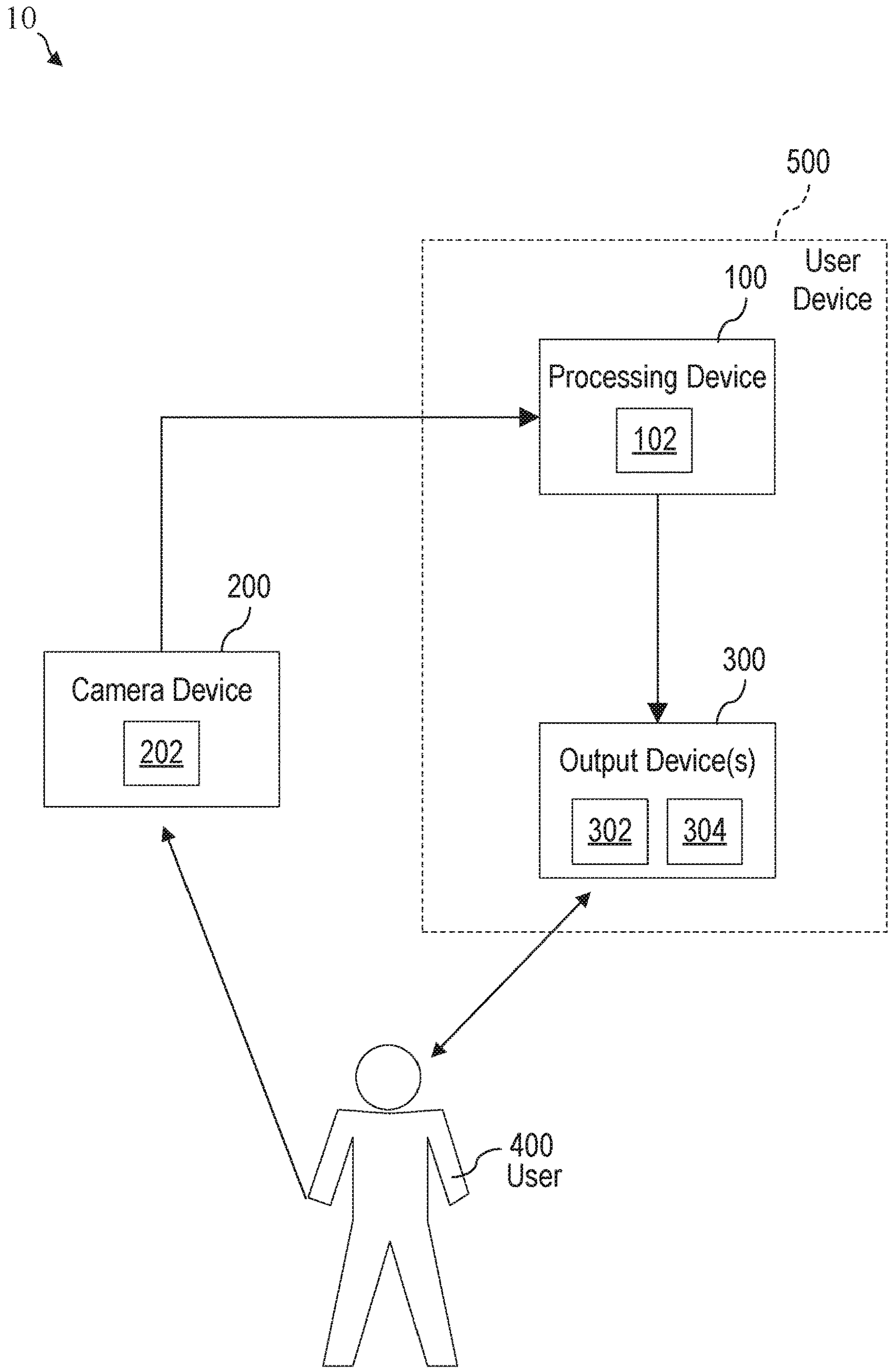
Figure 1D:
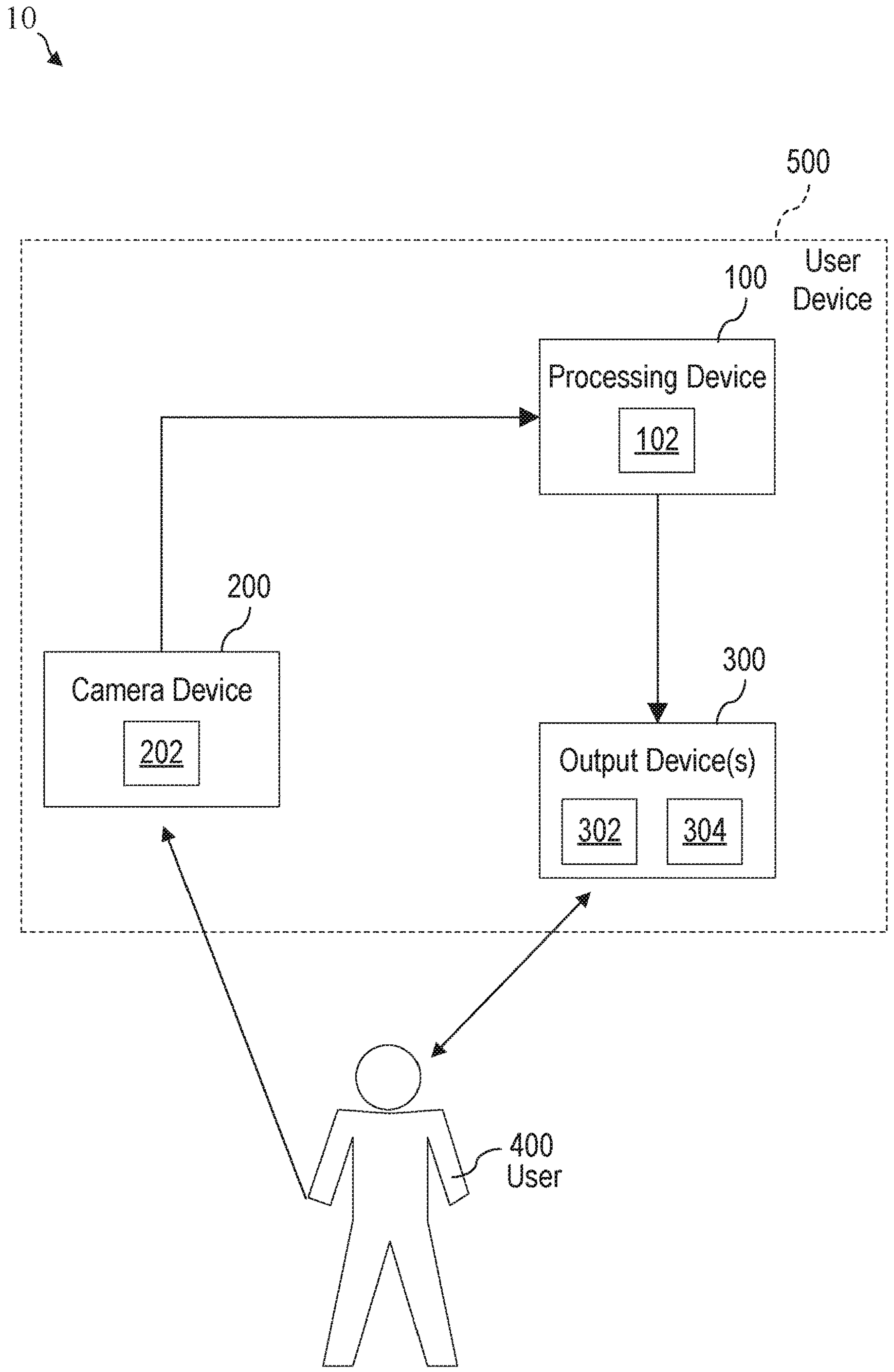

According to various aspects, at least two of them may be part of a same device. For example, as shown in FIG. 1B, the 3D-camera device 200 may include the processing device 100 and the one or more output devices 300. According to other examples, as shown in FIG. 1C and FIG. 1D, the system 10 may include a user device 500. According to some aspects, the user device 500 may include the processing device 100 and the one or more output devices 300 and the (e.g., 3D) camera device 200 may be separate to the user device 500 (see, for example, FIG. 1C). The user device 500 may be a smartphone, a tablet, a laptop, a personal computer (PC), a head-mounted display, augmented reality glasses, etc. According to other aspects, the user device 500 may include the processing device 100, the one or more output devices 300, and the (e.g., 3D) camera device 200 (see, for example, FIG. 1D). Hence, in this case, the (e.g., 3D) camera device 200 may be integrated into the user device 500.

As an example, the display device 302 may be a screen of the (e.g., 3D) camera device 200. As another example, the display device 302 may be a screen of a smartphone. In this case, the information and/or the preview and/or a captured immersive image may be shown in the screen of the smartphone (e.g., via a companion app for the (e.g., 3D) camera device 200). As a further example, the (e.g., 3D) camera device 200 may be a cam or webcam connected to a personal computer and the display device 302 may be a computer screen. Also, the display device 302 may be a computer screen and the information described herein may be provided to the user 400 after capturing the immersive image when using a rendering software (e.g., to create stereoscopic and/or (half-)spherical content (e.g., Blender or Unity on a PC). According to various aspects, the one or more output devices 300 may include an output device of a wearable device (e.g., a smartwatch, a smart ring, etc.).

It is understood that the output devices of the one or more output devices 300 may be part of different devices.

The one or more audio output devices 304 may be any kind of speaker(s) is accessible to the user 400, such as earphones, headphones, a Bluetooth stereo speaker, speaker in the (e.g., 3D) camera device, etc. The display device 302 may also be a display of a head-mounted display (HMD), of augmented reality glasses, and/or of augmented reality contact lenses. According to various aspects, the one or more output devices 300 may include a brain-computer interface (BCI) configured to input information directly into the human brain.

Also, the memory device, described herein, may be part of one of the devices 100, 200, 300, 500 or may be separate to them (e.g., the memory device may be a cloud storage device).

As described herein, the system 10 may provide assistance to the user 400 when capturing immersive images. FIG. 2A shows an exemplary assistance processing scheme according to various aspects. The one or more cameras 202 of the (e.g., 3D) camera device may provide an image to the one or more processors 102. This image may be a preview image representing a preview of an immersive image or may be an (already) captured immersive image. In the following, the assistance processing scheme is illustratively described for an immersive image 204. It is understood that the processing applies analogously to processing a preview image. Hence, the immersive image 204 may also be a preview image.

The immersive image 204 may have any kind of format prior to the processing described herein. According to various aspects, the immersive image 204 may be processed in the format it is when provided. According to other aspects, the immersive image 204 may be converted into another format prior to processing it. For example, for low field-of-view images the standard rectangular image format may be used as it is directly generated from the camera. 180° and 360° content is often captured with fisheye lenses and the image may be converted into an equirectangular format. The processing describe herein may either be done directly on the fisheye lenses, on the equirectangular format, or any other format representing such content (e.g., a Cubemap format, a Mercator projection, a stereographic projection, a sinusoidal projection, a Perice quincuncial projection, a Miller cylindrical projection, a Hammer projection, an azimuthal equidistant projection, a Fuller project, etc.). Also, as described herein, a plurality of perspective images may be generated from the immersive image 204 by spherical tessellation.

The one or more processors 102 may be configured to determine (in 108), whether a quality can be improved when capturing an immersive image. For example, in the case that the immersive image 204 is an already captured immersive image, it may be determined, whether the quality can be improved when capturing the scene associated with the immersive image 204 again (i.e., capturing a next immersive image). For example, in the case that the immersive image 204 is a preview image, it may be determined, whether the quality of an immersive image which is to be captured can be improved. The one or more processors 102 may be configured to determine (in 108), whether the quality of the immersive image 204 can be improved by at least one measure of one or more predefined measures. The one or more processors 102 may be configured to, in the case that it is determined that at least one measure of one or more predefined measures can improve the quality of the immersive image 204 ("Yes" in 108), provide control instructions 110 based on the at least one measure.

As shown in FIG. 2B, a measure for improving the quality may be associated with an issue which reduces the quality. Thus, the one or more processors 102 may be configured to determine (in 106), whether there are one or more issues within the immersive image 204 which reduce the quality of the immersive image 204. The one or more processors 102 may be configured, in the case that at least one issue is determined (in 106), to determine (in 108) that the quality can be improved. For example, the one or more processors 102 may determine at least one measure of the one or more predefined measures to solve the at least one issue. The one or more processors 102 may then provide the control instructions 110 in accordance with the at least one measure.

These control instructions 110 may provide an assistance to the user 400 when capturing immersive images. For example, the one or more processors 102 may be configured to provide the control instructions 110 to the one or more output devices 300 (e.g., the display device 302 and/or the audio output device 304) to control the one or more output devices 300 to output information which inform the user 400 that the at least one measure can improve the quality when capturing an immersive image. This kind of assistance may be referred to as a feedback-based assistance. The one or more processors 102 may be configured to provide the control instructions 110 to the (e.g., 3D) camera device 200 to control the (e.g., 3D) camera device 200 (e.g., with or without additionally informing the user 400 via the one or more output devices 300) to (automatically) change one or more settings (e.g., a focus) associated with capturing immersive images. This kind of assistance may be referred to as automatic assistance. It is understood that in some aspects the automatic assistance or the feedback-based assistance may be implemented and that, in other aspects, both, the automatic assistance and the feedback-based assistance, may be implemented. For example, if an issue can be solved automatically, the corresponding measure may be implemented as automatic assistance, and if an issue can only be solved by the user 400, the user 400 may be informed about the corresponding measure. In the following, various exemplary issues are described with their corresponding measure to solve the respective issue (either by means of a feedback or automatically).

Even though various aspects refer to providing the information visually and/or audibly to the user 400, it is understood that the information can be provided by any kind of output devices in text form, as an image, as icon, as voice, as a haptics signal (e.g., the (e.g., 3D) camera device 200 vibrates as warning if it is certain something is very wrong), etc.

In the case that the at least one measure is determined for a preview image, the information may be provided to the user 400 prior to taking the immersive image. According to various aspects, the information may be provided to the user 400 while the user 400 uses the (e.g., 3D) camera device 200 (i.e., while capturing immersive images). According to some aspects, the information may be provided to the user 400 after the user 400 took an immersive image. In the latter case, the user 400 may, for example, process the immersive image with a rendering software and the information may be provided to the user 400 to inform him/her how to take better immersive images (i.e., immersive images with improved quality) the next time.

As described herein, the immersive image 204 may be a stereoscopic image. The stereoscopic image may include a first image and a second image captured from a slightly different perspective. In this case, the one or more cameras 202 may include a first camera (having a first camera lens) configured to capture the first image and a second camera (having a second camera lens) configured to capture the second image. The first camera and the second camera may be arranged in a distance to each other. This distance may be selected in accordance with a human interpupillary distance (IPD). Hence, the first (e.g., left) camera may be associated with a left eye of a user (e.g., the user 400) and the second (e.g., right) camera may be associated with a right eye of the user. As described herein, it is understood that the one or more cameras 202 may include more than two cameras (e.g., with overlapping regions).

When capturing a stereoscopic immersive image, the first image and the second image are expected to look substantially the same except for a small shift in the position where the image was taken. This is comparable to humans which, most of the time, see almost the same on the left eye and right eye. Thus, in the case that an object (or more objects) is only visible in either the first image or the second image, the one or more processors 102 may (in 106) determine that there is an issue which reduces the quality of the immersive image 204.

According to various aspects, the one or more processors 102 may be configured to determine, whether an object is only visible in either the first image or the second image, using a stereo matching algorithm. The stereo matching algorithm may be, for example, a Stereo Block Matching algorithm, an EAI-stereo algorithm, or a CREStereo algorithm. In the stereo matching algorithms provides certain areas which lack corresponding feature points in the other image and in the case that these areas have a size equal to or greater than a predefined size threshold value, the one or more processors 102 may determine that the object associate with these features are shown in on image but not the other.

Figure 4:
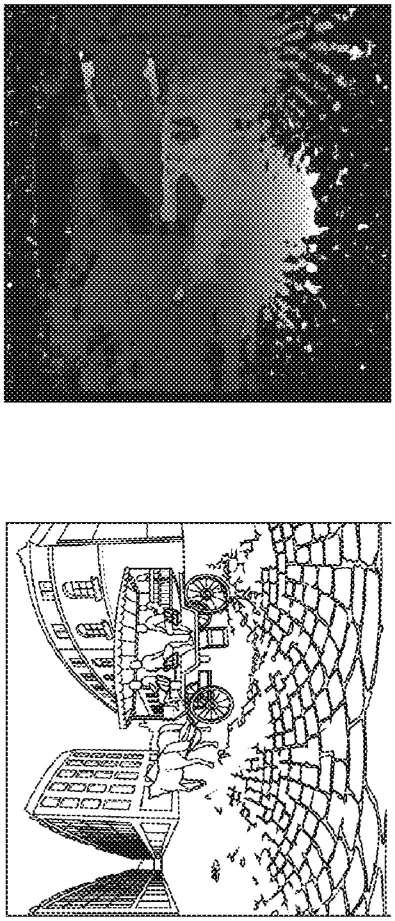
FIG. 4 shows an immersive image and a depth image generated from the immersive image.

According to various aspects, the one or more processors 102 may be configured to determine a depth map from the stereoscopic immersive image 204. In the case that there is an object only visible in either the first image or the second image, determining the depth map may result in an erroneous depth value for the object. Thus, the one or more processors 102 may be configured to determine, whether the depth map includes an erroneous depth value for the object, and, in the case that it is determined that the depth map includes an erroneous depth for the object, determine that there is an object only visible in either the first image or the second image. FIG. 4 shows an exemplary immersive image 400 and a graphical representation 402 of a depth map generated for the immersive image 400. The one or more processors 102 may be configured to determine a respective size of each object detected within the immersive image 204 using the depth map. The one or more processors 102 may be configured to determine a respective distance of each object from a center of the sphere using the depth map. The size of the objects and/or their distance from the center of the sphere may be determined using the distance between the first camera and the second camera of the (e.g., 3D) camera device. This distance between the first camera and the second camera may correspond to a selected (e.g., average (of about 63 mm)) interpupillary distance (IPD) of humans. Illustratively, using the distance between the first camera and the second camera may allow to map the depth values of the depth map to units like centimeters or meters. According to some aspects, the one or more processors 102 may be configured to implement a machine-learning algorithm (e.g., 2D to depth conversion) configured to generate the depth map from an image. According to other aspects, the system 10 may include one or more sensors configured to detect a depth map, such as an ultrasonic sensor, a radio detection and ranging (radar), and/or a light detection and ranging (lidar) sensor.

Each pixel in the first image may be bijectively assigned to a corresponding pixel in the second image (e.g., both, the first image and the second image, may have the same image resolution). According to various aspects, the one or more processors 102 may be configured to determine, for each pixel, a respective difference between a color value of the pixel in the first image and a color value of the corresponding pixel in the second image. In the case that for one or more pixels the determine difference is equal to or greater than a predefined color threshold value, the one or more processors 102 may be configured to determine that the first image or the second image shows at least one object not shown in the other image.

An object may only be visible in either the first image or the second image in the case that the object is close or at to the associated (first or second) camera. According to various aspects, the one or more processors 102 may be configured to determine a type of the object (or each object in the case that there are more than one) shown in only one of the two images. Some exemplary types may be associated with the camera itself (e.g., the camera lens). For example, a type of the object may be a lens flare, light rays (e.g., sun rays and/or crepuscular rays, a lens defect (e.g., a scratch and/or a dent). Other exemplary types may be associated with an object directly on the camera (e.g., the camera lens). Such exemplary types of the object may be a drop of a liquid (e.g., a raindrop, a pool water drop, an ocean water drop, etc.), a dust particle, and/or a fingerprint. Even other exemplary types may be associated with an object close but not at the camera (e.g., the camera lens), such as a small object (e.g., an insect, pollen, etc.) or a finger of the user. The type of the object may be referred to as object type. In the following, various types of objects which cause an issue and their corresponding measure(s) are described:

The one or more processors 102 may be configured to determine, whether the object has an ellipsoidal (e.g., circular) shape. The one or more processors 102 may be configured to determine, in the case that it is determined that the object has an ellipsoidal shape, whether there is color fringing at a border of the object. The one or more processors 102 may be configured to determine, in the case that it is determined that the object has an ellipsoidal shape with color fringing at a border of the object, a drop of a liquid (e.g., a raindrop) as object type. Color fringing may be detected by doing a color search. The one or more processors 102 may be configured to determine, in the case that it is determined that the object has an ellipsoidal shape but no color fringing at a border of the object, a dust particle or a fingerprint as object type. The one or more processors 102 may be configured to differentiate between dust particle and fingerprint based on shape and/or size. The one or more processors 102 may be configured to, as a measure of the one or more predefined measures, the quality of the immersive image 204 can be improved by cleaning the lens of the corresponding camera. Hence, in the case that it is determined that the first image shows the object not shown in the second image, the measure may be cleaning the lens of the first camera, and, in the case that it is determined that the second image shows the at least one object not shown in the first image, the measure may be cleaning the lens of the second camera.

The one or more processors 102 may be configured to determine based on a size of the object and/or one or more color values associated with the at least one object, whether the at least one object is a portion of a finger. A measure may be to (inform the user 400) to remove the finger from the lens.

Various of the above described issues may also be present when the user 400 is not using the (e.g., 3D) camera device 200. According to various aspects, the one or more processors 102 may be configured to check for the herein described issues during a startup of the (e.g., 3D) camera device 200 and/or during shutdown (e.g., as a self-check to detect dirt, rain, etc.). For example, when checking during shutdown, it may be prohibited that the user 400 stores the (e.g., 3D) camera device 200 in a contaminated state, thereby increasing the lifetime of the (e.g., 3D) camera device (e.g., since, for example, dried raindrops might leave dirt that is harder to remove later).

The one or more processors 102 may be configured to determine, whether the object is star-shaped and/or includes one or more circular rings. The one or more processors 102 may be configured to determine, in the case that it is determined that the object is star-shaped or includes one or more circular rings, a lens flare as object type. According to various aspects, the (e.g., 3D) camera device 200 may include one or more orientation sensors (e.g., one or more inertial measurement units) configured to determine an orientation of the (e.g., 3D) camera device 200. As described herein, the one or more processors 102 may receive a preview image stream from the (e.g., 3D) camera device 200. Each preview image of the preview image stream may include orientation data (e.g., as part of meta data) representing a respective orientation of the (e.g., 3D) camera device 200 when capturing the preview image. The one or more processors 102 may be configured to determine, based on the preview image stream, whether the position of the object changes (within the image) when the orientation of the (e.g., 3D) camera device 200 changes. The one or more processors 102 may be configured to determine that the object is a lens flare (as object type) in the case that the position of the star-shaped object or of the one or more circular rings varies with changing orientation of the (e.g., 3D) camera device 200.

The one or more processors 102 may be configured to determine, whether the object includes one or more lengthy stripes associated with a bright light source. The one or more processors 102 may be configured to determine, in the case that it is determined that the object includes one or more lengthy stripes associated with a bright light source, light rays as object type. The light rays may be, for example, crepuscular rays (also referred to as god rays) or (reflected) sun rays. The one or more processors 102 may be configured to determine, whether an object in a surrounding of the at least one object is associated with a sky (e.g., a cloud, a blue color, etc.). The one or more processors 102 may be configured to determine, in the case that it is determined that the object includes one or more lengthy stripes associated with a bright light source and that an object in the surrounding of the object is associated with the sky, determine crepuscular rays as object type. The one or more processors 102 may be configured to determine, in the case that it is determined that the object includes one or more lengthy stripes associated with a bright light source and that no object in the surrounding of the object is associated with the sky, reflected sun rays as object type.

A measure against lens flares and/or light rays may be to change the position of the (e.g., 3D) camera device 200 (e.g., to move the (e.g., 3D) camera device 200) and/or to rotate the (e.g., 3D) camera device 200. In the case of lens flares and/or sun rays, the one or more processors 102 may be configured to determine, whether there is a further object (e.g., a house, a car, etc.) which is larger than the object and in a surrounding of the object. The one or more processors 102 may be configured to determine, in the case that it is determined that there is such a further object, that, as a measure of the one or more predefined measures, the quality of the immersive image 204 can be improved by moving (i.e., changing a position of) the (e.g., 3D) camera device 200 such that the further object is located between the (e.g., 3D) camera device 200 and the object causing the lens flare or sun rays.

The one or more processors 102 may be configured to determine, whether at least one object of the one or more objects is associated with a reflection (e.g., a specular highlight). A measure against a reflection may be to change a position of the (e.g., 3D) camera device 200.

The one or more processors 102 may be configured to determine, whether an object is associated with a Moiré effect. A measure against a Moiré effect may be to change a position of the (e.g., 3D) camera device 200 (e.g., by moving further away from the object or closer to the object) and/or to change an angle to the object.

The one or more processors 102 may be configured to determine, whether the object is associated with a tripod (e.g., a portion of the tripod). As a measure may be to change to a setup in which no tripod is visible when capturing an immersive image. An example of changing the setup when using a tripod is described herein with reference to spherical images.

The one or more processors 102 may be configured to determine, whether the at least one object is close to a corresponding lens of the first lens and the second lens but not directly at the corresponding lens (e.g., the object may be an insect, a pollen particle, etc.). This may be an issue since a user may not be capable to focus on the object when viewing the immersive image 204 in computer-simulated reality. The one or more processors 102 may be configured to, in the case that it is determined that the object is close to but not at the corresponding lens, determine as a measure of the one or more predefined measures to capture the immersive image after a waiting time period and/or to change a position of the (e.g., 3D) camera device 200.

The one or more processors 102 may be configured to receive a plurality of immersive images captured by the one or more cameras 202 of the (e.g., 3D) camera device 200. The immersive images of the plurality of immersive images may be associated with different positions of the (e.g., 3D) camera device 200 and/or different rotations of the (e.g., 3D) camera device 200. The one or more processors 102 may be configured to determine, whether two or more immersive images of the plurality of immersive images shows a same object at a substantially same position within the respective image. In this case, the one or more processors 102 may determine that this object is a lens defect, such as a scratch, a dent, etc.

A measure against a lens defect may be a repair and/or replacement of the lens corresponding to the camera which shows this object (not present in the image of the other camera). Also changing a position relative to a light source may reduce the impact of the issue.

Various aspects refer to the detection of objects within an image. It is understood that the one or more processors 102 may be configured to implement any algorithm suitable for object detection in images (e.g., image segmentation). According to various aspects, the one or more processors 102 may determine the object type based on the above described features. According to other aspects, the one or more processors 102 may be configured to implement a semantic image segmentation algorithm configured to detect and classify (i.e., determine the object type) objects.

This semantic image segmentation algorithm may be a semantic image segmentation algorithm for immersive images. However, training such a semantic image segmentation algorithm for immersive images may require a high computational cost.

Various aspects refer to the detection of objects within a stereoscopic immersive image. It is understood that this serves for illustration and that the objects described herein (e.g., a drop of a liquid, a lens defect, a dust particle, lens flares, light rays, etc.) may also be detected within monoscopic immersive images. For example, the objects may be detected in a monoscopic immersive image using a semantic image segmentation algorithm (e.g., employing the image tessellation scheme described herein).

In general, detecting objects within an immersive image (e.g., the immersive image 204) may require a high computational cost due to distortions present in immersive images (e.g., Tissot distortions). For example, further training a two-dimensional (e.g., semantic) image segmentation algorithm using immersive images is computationally costly since the shape of an object (e.g., a human, a face, a car, etc.) varies depending on the position of the object within the immersive image due to the distortions described above. According to various aspects, the one or more processors 102 may be configured to generate a plurality of (two-dimensional) perspective images from the immersive image 204 and to detect the objects within the plurality of perspective images (e.g., within a common perspective image generated by combining the images of the plurality of perspective images). This allow to significantly reduce the required computational cost. The plurality of perspective images may be generated using the tessellation described with reference to FIG. 5A to FIG. 5D. Hence, a common (two-dimensional) semantic image segmentation algorithm can be employed for object detection within the immersive image 204 using the tessellation algorithm. A two-dimensional (e.g., semantic) image segmentation algorithm, as used herein, may be or may employ any (e.g., common) two-dimensional image segmentation algorithm, such as an image segmentation convolutional neural network (CNN), the Mask R-CNN (e.g., as described in He et al.: "Mask R-CNN", arXiv:1703.06870v3, 2018), the DeeplLabV3 algorithm (e.g., as described in Chen et al.: "Rethinking Atrous Convolution for Semantic Image Segmentation", arXiv:1706.05587v3, 2017), Graphonomy (e.g., as described in Gong et al.: "Graphonomy: Universal Human Parsing via Graph Transfer Learning", arXiv:1904.04536v1, 2019), or any other algorithm capable to carry out image segmentation (e.g., semantic image segmentation) of an image.

It is understood that the one or more processors 102 may also detect the objects within the immersive image 204 using another object detection algorithm. Further, it is understood that the two-dimensional semantic image segmentation is an example of processing a perspective image. The one or more processors 102 may be configured to implement any (two-dimensional image processing) algorithm configured to detect objects. This allows to process any immersive image using a (e.g., common) two-dimensional image processing algorithm.

As described, objects at or close to a camera lens of the (e.g., 3D) camera device 200 may lead to certain issues. However, not only objects at or close to a camera lens may lead to issues which reduce the quality of an immersive image.

As an example, small objects in the background of the immersive image may disturb the immersive image due to the limited resolution and depth perception of the (e.g., 3D) camera device 200. Thus, the one or more processors 102 may be configured to determine, whether there is an object which is associated with a moving object (e.g., a bird, a plane, a drone, etc.) in the background of the image. In the case that such an object is detected, a measure may be to wait until the object cleared away. For example, the one or more processors 102 may be configured to continuously determine for the preview image stream whether the object cleared away and may then inform the user 400 accordingly.

Humans have a certain minimum distance for seeing objects sharp. This distance changes with age. For example, at an age of 45 years, the near-point value for seeing sharp is in average about 25 cm (with 50 it is at about 50 cm, with 60 it is at about 65 cm). The control instructions 110 may include information warning the user 400 about objects not having the minimum distance. There may be several warning levels: as an example, there may be a first warning level int the case that the distance is between 50 and 65 cm and a second stronger warning level in the case that the distance is less than 50 cm. In the case that the distance is less than about 10 cm, the one or more processors 102 may be configured to determine an error state indicating that the image will be unusable. A measure may be to move the (e.g., 3D) camera device 200 further away from the object. In it understood that this may apply to a (e.g., 3D) camera device 200 where the lenses roughly match the human interpupillary distance (IPD). There might be special macro-lens 3D stereo rigs where these settings do not apply as they on purpose capture very close content—but, then they keep the distance between the lenses much smaller. For this kind of use cases, the threshold for warnings and/or errors may be adjusted to the right use case. For examples, in the case that the distance between the lenses is only 1/10 of the human IPD, our tolerance for distances may be increased by at least 10 times. There might be non-linear scaling factors coming in at some ranges. Usually, a practical setup with test persons of different age may lead to the correct values to be used in such setups.

The one or more processors 102 may be configured to determine, using the depth map (and optionally an interpupillary distance of the user 400 or a predefined IPD), whether the objects shown in the immersive image 204 have a distance to the (e.g., 3D) camera device 200 equal to or greater than a predefined minimum distance value. The one or more processors 102 may be configured to determine, in the case that it is determined that at least one object has a distance to the (e.g., 3D) camera device 200 less than the predefined minimum distance value, that, as a measure of the one or more predefined measures, the quality of the immersive image can be improved by moving the (e.g., 3D) camera device 200 further away from the at least one object.

Another example of a measure which can improve the quality when capturing an immersive image is to position objects of interest in a center region of the immersive image. The one or more processors 102 may carry out an object detection, as described herein, and may be configured to determine one or more objects of interest based on the detected objects. An object of interest may be, for example, a person, a face of a person, etc. In the case that the object of interest is not arranged in a center portion of the immersive image 204, the control instructions 110 may include, as a measure, to rotate the (e.g., 3D) camera device 200 to position the object of interest in the center region of the immersive image. For example, in the case that a single object of interest, e.g., a human face being placed beyond a certain threshold away from the center (e.g., 10% too much on the right), a warning about this may be provided. The control instructions 110 may include information in which direction to move to position the object centered. In the case that there are two objects, e.g., two people standing next to each other, photographed, their bounding rectangle may be used to make sure that the center of the rectangle is in the center of what the (e.g., 3D) camera device captures. The same applies for a group photo. The bounding rectangle of the group should be mostly in the center for best stereo quality. In the case that there are two objects of interest, one to the very left and one to the very right, the measure to improve the quality may be to step back further so the relative position will get closer to the center for the objects of interest.

Even though, when capturing a monoscopic immersive image in VR360, there may be no minimum distance associated with focusing on an object, there may still be a minimum distance for images to look reasonably good. The advice (e.g., measure) may be have a distance of at least about 1 meter to all objects around the (e.g., 3D) camera device (e.g., except for the tripod). As describe herein, the respective distance of the objects may be determined using the depth map. As an example, the control instructions 110 may include warnings. For example, a warning in the case that there is an object in a range from about 0.5 m to about 1 m distance. There may be an error notification in the case that there is an object in a distance below about 0.5 m. An exception may be a macro lens setup, as described herein. However, there may also be a scalable minimum value for such a setup that makes sense and one where there is no real value in capturing too close content.

Besides the minimum distance for seeing objects sharp, when humans observe a scene stereoscopically (e.g., in the real world), their eye will have a certain vergence to focus on an object. Also, the eye lens accommodation will make sure that this point at the certain depth is sharp. This is commonly referred to as "vergence-accommodation". It decreases with the age of 40 or 45 and older as the eye muscles of the humans are getting weaker. However, while still strong enough, those two factors play well together and give the human perception the feeling of seeing something correct stereoscopically. Besides warnings and/or errors, the control instructions 110 may include information to increase the distance to the too close object (the warning may be removed once this is cleared). This warning may be shown visually on the display device 302 with a variety of colors (e.g., red for very wrong regarding minimum distance, orange for medium wrong, yellow for small distance errors). Also, a louder sound when errors are large could be outputted via the one or more audio output devices 304. The volume may be reduced when the (e.g., 3D) camera device 200 moves back and the error becomes smaller. The same applies for haptic feedback, going from strong to medium to low to no vibrations to indicate a warning and/or error.

When capturing a scene with a (e.g., 3D) camera device 200 which has both close objects and very far objects (e.g., a person with 1.5 meters away from the (e.g., 3D) camera device 200 and mountains kilometers away from the (e.g., 3D) camera device 200), the image would cover a huge variety in depth. During human perception, the vergence and accommodation would clearly change when switching between the focus of the close person and the mountains in the back. However, this cannot happen with the stereoscopic immersive image which (in most setups) may be taken either with parallel views or at different focus levels with slightly inward rotated views. Therefore, each stereoscopic image may have a certain "stereo window" in which perception for humans will be fine. If it goes too much out of this stereo window, issues like eye strain and motion sickness might occur. It might occur, that the eyes have to change to an outwards orientation which does not happen in humans with healthy vision otherwise. The one or more processors 102 may be configured to determine whether the immersive image 204 fulfills a predefined stereo window. The control instructions 110 may include information for the user indicating whether the stereo window is fulfilled or at least information in the case that the stereo window is not fulfilled. For example, in the case of being outside the stereo window there may be: for 5% to 10% a warning, for more than 10% an error, and for more than 30% a larger error hint.

As describe herein, the respective distance of each object may be determined using the depth map. The one or more processors 102 may be configured to determine a distance difference between a distance associated with an object furthest away from the (e.g., 3D) camera device 200 and a distance associated with an object closest to the (e.g., 3D) camera device 200 (hence, a stereo window). The one or more processors 102 may be configured to determine, whether the distance difference is greater than a predefined upper distance threshold value (e.g., being outside the stereo window). The one or more processors 102 may be configured to determine, in the case that it is determined that the distance difference is greater than the predefined upper distance threshold value, as a measure of the one or more predefined measures, to move the (e.g., 3D) camera device 200 to reduce the difference (hence, to fulfill the stereo window).

Illustratively, the one or more processors 102 may determine whether the immersive image (that is taken or will be taken) is within the correct boundaries of the stereo window for pleasant viewing. For example, the control instructions 110 may include instructions to control the display device 302 to display how much depth variation there is (e.g., with green values for a valid stereo window and red or blue values for invalid out of boundary objects). As measure, the assistance may indicate in which direction the (e.g., 3D) camera device 200 should be moved to get a better stereo window.

An immersive image having a stereo window below a certain threshold value may have substantially no depth variation being almost a perspective image. Therefore, the one or more processors 102 may be configured to determine, whether the distance difference is equal to or less than a predefined lower distance threshold value. The one or more processors 102 may be configured to determine, in the case that it is determined that the distance difference is equal to or less than the predefined lower distance threshold value, determine, as a measure, the quality of the immersive image can be improved by moving the (e.g., three-dimensional) camera device 200 to increase the overall depth variation (e.g., by finding another object at a different depth, such as a house in front of mountains)

Further, there may be issues specifically for the case that the immersive image 204 is a spherical or half-spherical immersive image:

As described herein, the system 10 may include a tripod on which the (e.g., 3D) camera device 200 may be arranged for capturing immersive images. In the case of capturing a spherical immersive image (e.g., a 180°×180° or 360°×180° spherical immersive image) using a tripod, the tripod will almost always the be visible in the immersive image. It is understood that the tripod is an example for a stand and that the system 10 may include another stand, such as a monopod. As described above, the one or more processors 102 may be configured to detect the tripod within the immersive image 204 (e.g., as object leading to an issue).

The control instructions 110 may include information on how to improve the setup such that the tripod is not shown in the immersive image or at least the size of the shown tripod is reduced. Some measures for improving the quality of the immersive image may include devices the (e.g., 3D) camera device 200 may (already) include. Some measures for improving the quality of the immersive image may include additional devices. Thus, in the case that the user 400 has the additional device by hand, he/she might change the setup for capturing spherical immersive images. Thus, in the case that the user 400 does not have the additional device by hand, he/she might consider changing the setup the next time capturing spherical immersive images.

In the case of using a tripod for capturing half-sphere (VR180) immersive images, the measure (and hence the control instructions 110) may include using a rail (as additional device or as part of the (e.g., 3D) camera device 200) to offset the (e.g., 3D) camera device 200 such that the tripod legs are not visible. As described herein, the one or more processors 102 may generate a depth map from the immersive image 204 and may, using the IPD, determine depth values from the depth map. Thus, the one or more processors 102 may be configured to determine a distance of the tripod (e.g., tripod leg(s)) shown in the immersive image 204 and to determine an offset value representing an offset required to not show the tripod in the immersive image 204.

According to various aspects, the system 10 (e.g., the (e.g., 3D) camera device 200) may include the rail. The offsetting of the 3D camera 200 using the rail such that the tripod is not shown may be provided as automatic assistance. Hence, the control instructions 110 may include instructions to a motor (configured to drive the rail) to control the motor to offset the rail (with the (e.g., 3D) camera device 200) in accordance with the determined offset value.

The control instructions 110 may also include information for the user 400 informing him/her that for (e.g., 3D) camera devices 200 having a weight equal to or greater than a weight threshold value, a counter weight on the opposite side of the rail may be required. The immersive image 204 may include information (e.g., as part of the meta data) about the camera model, the lenses, etc. The one or more processors 102 may be configured to determine the weight of the (e.g., 3D) camera device 200 using this information. The one or more processors 102 may be configured to determine a weight of the counter weight based on the weight of the (e.g., 3D) camera device 200. The control instructions 110 may include a recommendation for the counter weight in accordance with the determined weight (e.g., a counter weight of about 90% of the weight of the (e.g., 3D) camera device 200). The one or more processors 102 may be configured to determine a weight of the counter weight depending on a position of the rail. As understood, in the case that the position of the rail is changed, the leverage of the camera device 200 changes, thereby changing the required weight of the counter weight. The control instructions 110 may include a recommendation for positioning the rail (e.g., using a (manufacturer) model of the rail) and/or and a corresponding weight of the counter weight.

According to some aspects, the (e.g., 3D) camera device 200 may, when capturing immersive images, not be arranged on a tripod but on a physical object in the real world, such as a wall. In this case, the one or more processors 102 may be configured to detect the wall as object in the immersive image 204. The distance of the physical object may be determined using the depth map, as described herein. The control instructions 110 may include, as a measure, to move the (e.g., 3D) camera device 200 closer to an edge of the physical object (such that the physical object will not be shown when capturing an immersive image).

In the case of using a tripod for capturing spherical (VR360) immersive images, it may be hard to avoid that the tripod is seen in an immersive image. However, a measure may be to reduce the size of the shown tripod. The one or more processors 102 may be configured to how many percent of the pixels of the immersive image 204 are associated with the tripod (e.g., by analyzing the lower third of the immersive image (e.g., using image segmentation). The control instructions 110 may include, as a measure for improving the quality, to mount a selfie-stick on top of the tripod to offset the height of the (e.g., 3D) camera device 200. By this, the tripod will be further away and consumes less pixels on the final image. The selfie-stick may be (for a 360° (e.g., 3D) camera device 200) not shown in a captured immersive image (hence, may be "invisible"), because the 360° (e.g., 3D) camera device 200 itself may consist of two 190° degrees lenses, which are physically apart (e.g., by about 2 centimeters). Within this distance, such a 360° (e.g., 3D) camera device 200 has a "blind spot" in which the selfie-stick may hide and, thus, not be shown in the final image. The one or more processors 102 may be configured to detect the selfie-stick as an object. For example, in the case that the selfie stick has a thickness of about 3 cm and the camera lenses are 2 cm apart, the selfie-stick may be shown when capturing an immersive image. A measure for improving the quality may be to change to a selfie-stick having a thickness equal to or less than about 2 cm. It is understood that using the selfie-stick may also be used in the case of capturing VR180 immersive images (e.g., as alternative to the rail since the selfie stick may be cheaper and/or easier available).

As described herein, a spherical immersive image may be captured using a first half-spherical (e.g., 190°) immersive image having the Fisheye format and a second half-spherical (e.g., 190°) immersive image having the Fisheye format. The first half-spherical immersive image and the second half-spherical immersive image may be stitched together to generate the spherical immersive image. When stitching the images together, areas may be overlapped. However, in the spherical immersive image these overlapped areas may be visible. The one or more processors 102 may be configured to determine objects in this overlapping region (e.g., using the preview image prior to capturing the immersive image). In many cases, we as humans are not super-sensitive if this impacts unimportant objects like far away mountains having a slight error, a distant tree or house with very small issues. However, humans are (very) sensitive regarding face detection of other humans (or animals) and also when viewing written text which we expect to be properly aligned. The one or more processors 102 may be configured to determine, whether an object (or more objects) shown in the overlapping region (e.g., in a range from about 178° to about 190° (or in a setup with two 185° lenses: from about 178° to about 185°, etc.)) is associated with a face (e.g., a human face and/or animal face) and/or written text. For example, the face may be detected using a face detection algorithm. The written text may be detected using optical character recognition (OCR). In the case that there is a face and/or written text in the overlapping area, the control instructions 110 may include corresponding measure(s). In the case where exactly one face is detected in the whole immersive image, it may be determined that this person is to be shown outside the overlapping region. In the case where multiple people are detected in the immersive image, the one or more processors 102 may be configured to determine, whether there is a rotation of the (e.g., 3D) camera device 200 for which the largest number of human faces will be outside the stitching area. According to some aspects, the memory device may store a face of the user 400 (e.g., the photographer). The one or more processors 102 may be configured to determine, whether one of the detected faces in the immersive image is associated with the user 400 and may prioritize the user 400 to be shown outside the stitching area. The prioritization may happen, for example, in the case that there is no rotation of the (e.g., 3D) camera device 200 at which neither a face nor written text is shown in the stitching area. As an example, faces may be prioritized over written text, human faces may be prioritized over animal faces, etc.

Further, there may also be a rotation of the (e.g., 3D) camera device 200 in which the stitching area shows very little content (e.g., an opening on both sides when standing in a forest). Then, the measure may be to rotate the (e.g., 3D) camera device 200 such that there are less objects (and more sky or unimportant background) in the stitching area and, thus, less potential stitching problems.

As describe herein, the assistance scheme may include one or more automatic measures. It is understood that the automatic measures may also be implemented feedback-based.

Figure 1E:
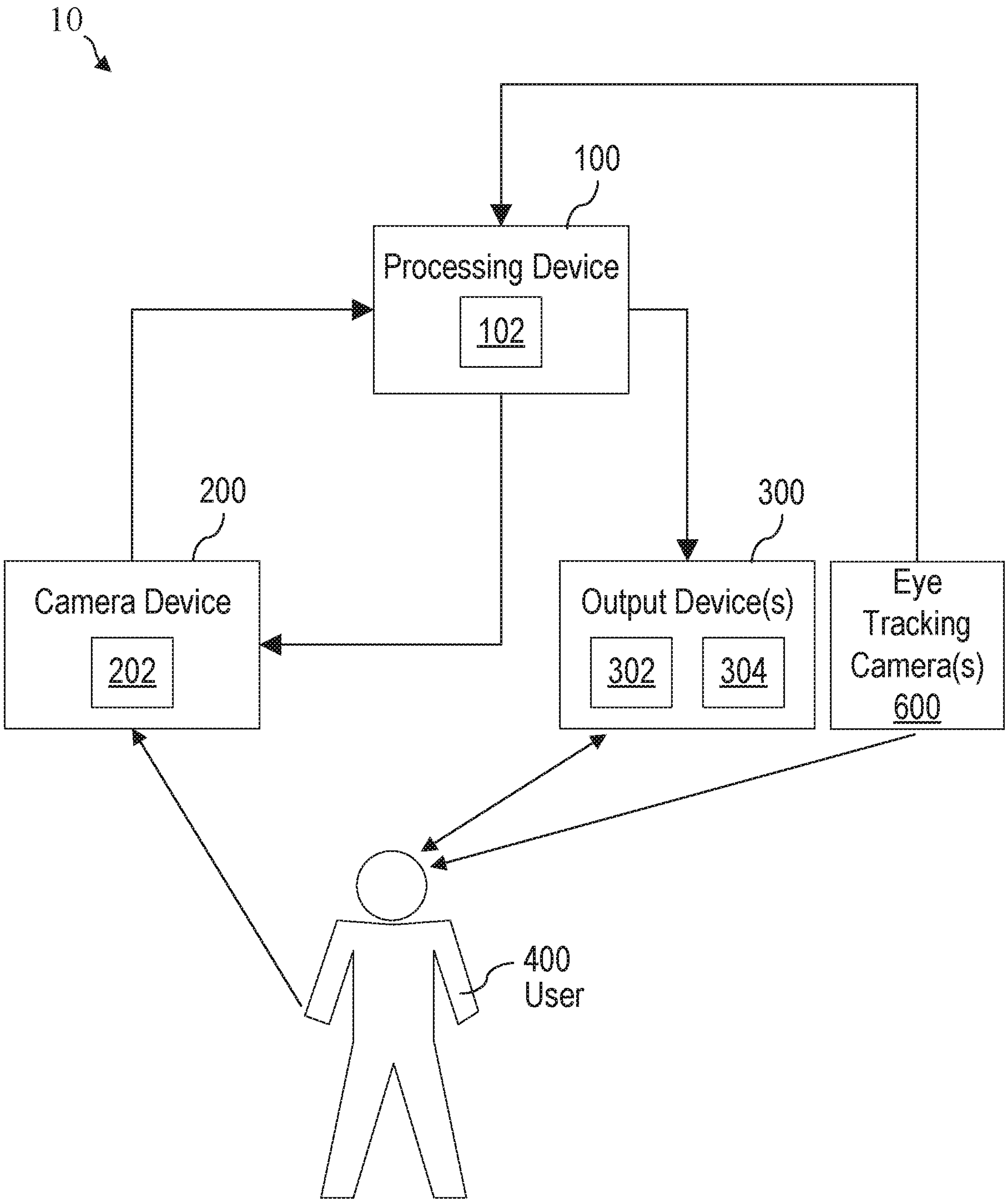

As exemplarily shown in FIG. 1E, the system 10 may include one or more eye-tracking cameras 600. The one or more eye tracking cameras 600 may be configured to detect eye-tracking data representing an eye-viewing direction and/or a focus depth of the user 400. For example, the system 10 may include the display device 302 displaying the preview image stream. The one or more processors 102 may be configured to determine, based on the eye-tracking data, at which object of the preview image the user 400 is looking at. Thus, given the convergence of the eyes, it may be mapped exactly where the photographer is looking at including the depth of the object. This allows for a finer precision adjustment of the object to focus on. For example, if five people are standing in a row, only with a small offset to the side from each other, just having a 2D-tracked method might not be able to clearly determine at which person the user 400 (e.g., photographer) looks at. Having the 3D-input, the one or more processors may exactly match at which person the user 400 is focusing on and adjust the lenses focus settings for this. The control instructions 110 may then include instructions to control the (e.g., 3D) camera device 200 to focus on the object the user 400 is looking at. Hence, the automatic assistance provides an auto-focus assistance. According to an example, the display device 302 may be a display of the (e.g., 3D) camera device 200 and the (e.g., 3D) camera device 200 may include the one or more eye-tracking cameras 600 arranged on a backside of the (e.g., 3D) camera device. According to another example, the display device 302 may be a display of the user device 500, such as a smartphone, tablet, etc., and the user device 500 may include the one or more eye-tracking cameras 600. The user device 500 may be a head-mounted display including the display device 302 and the one or more eye-tracking cameras 600. According to some aspects, the system 10 may include the brain-computer interface configured to detect brain patterns. The one or more processors 102 may be configured to determine, using the brain patterns, an object the user 400 is thinking of and may control the (e.g., 3D) camera device 200 to focus on that object The quality of an immersive image may be improved by keeping the (e.g., 3D) camera device 200 substantially straight when taking the immersive image (since motion is provided in the computer-simulated environment). According to various aspects, the one or more processors 102 may be configured to determine, using the one or more orientation sensors of the (e.g., 3D) camera device 200, an offset value representing an offset of the orientation of the (e.g., 3D) camera device 200 from a horizontal orientation (e.g., horizontal alignment). The one or more processors 102 may be configured to determine, whether the offset value is equal to or greater than a predefined offset threshold value, and, in the case that it is determined that the offset value is equal to or greater than the predefined offset threshold value, to control the display device 302 to display a water-scale representing the orientation of the (e.g., 3D) camera device 200.

Also, when capturing a 3D-Video it may important that (e.g., when the (e.g., 3D) camera device 200 is moved or held in a hand of the user 400) the images are not shaky Even the smallest, but frequent movements from an unsteady hand can easily lead to motion sickness when watching this video in computer-simulated environment. Therefore, the one or more processors 102 may be configured to detect such movements during movie recording using the (e.g., 3D) camera device 200. A measure against this issue may be to provide a warning that a gimbal should be used or a static position (such as a tripod or an object to place the (e.g., 3D) camera device 200) is advised. In this case that the one or more processors 102 determine that most likely the full movie will not be very useful, the one or more processors 102 ma control the (e.g., 3D) camera device 200 to enter into an automatic screenshot mode for the video. At certain moments in time, individual images out of the video may then be saved. Criteria, as described herein, may be used to rate the images (e.g., not blurred, not closed eyes, a valid stereo window, objects not too close etc.). This allows (e.g., in the case of shaky video recording out of a hand) to generate a valuable image drop out for the user without the user 400 having to go manually through the video for finding useful images.

Figure 3D:
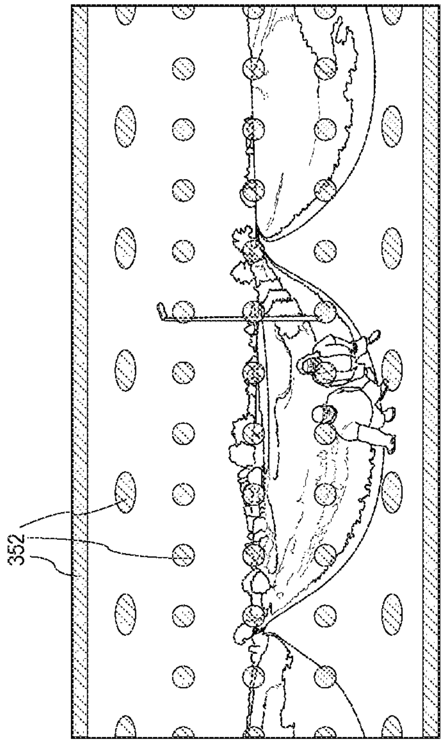
FIG. 3D and FIG. 3E each show distortions within a respective immersive image having an Equirectangular format.
Figure 3E:
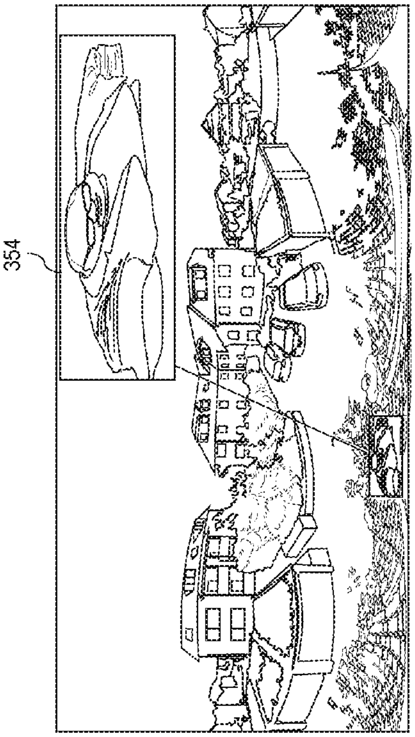

There may be further issues which reduce the quality when capturing immersive images but which may not be solved automatically or by informing the user 400. In the following, various issues are described as well as their corresponding features of the system 10 which allow to solve the respective issue:

As described herein, there may be certain distortion within immersive images. For example, in the case of the Fisheye format (see, for example, FIG. 3B), scene parts closer to the border of the image are compressed in space more than scene parts in the center of the fisheye lens. In the case of the Equirectangular format, there distortions called Tissot distortions or Tissot's indicatrix (or indicatrices). FIG. 3D shows such distortions 352 for the exemplary immersive image 350A. As shown, a lower edge portion and a higher edge portion of immersive images having the Equirectangular format are highly distorted, in particular stretched. FIG. 3E shows another exemplary immersive image 350D having the Equirectangular format. In FIG. 3E, a portion 354 of the lower edge region of the immersive image 350D is zoomed out illustrating that a person located in the lower edge region is shown in a stretched manner. Hence, in Equirectangular format, objects close to the poles of the sphere are stretched.

Hence, there may be different kind of distortions depending on the format of the immersive image. According to various aspects, the (e.g., 3D) camera device 200 may be configured to capture immersive images in the Fisheye format. The one or more processors 102 may receive a captured immersive image from the (e.g., 3D) camera device 200 in the Fisheye format. The one or more processors 102 may be configured to determine, whether there are objects of interest at the poles. In the case that there are objects of interest at the poles, the one or more processors may be configured to determine to not convert the captured immersive image into the Equirectangular format when storing the captured immersive image in the memory device. The one or more processors 102 may be configured to determine, in the case that there are no objects of interest at the poles, to convert the captured immersive image into the Equirectangular format when storing the captured immersive image in the memory device. In the case that it is determine that the captured immersive image is not converted into the Equirectangular format when storing the captured immersive image, the captured immersive image may be stored in the Fisheye format or may be, prior to storing, converted into another format (e.g., the Cubemap format) different from the Equirectangular format.

Another issue reducing the quality when capturing immersive images may be when the user 400 is shown in the immersive image. According to various aspects, the assistance scheme may allow to capture a spherical)(360° immersive image without the user 400 being shown. The one or more processors 102 may receive the preview image stream. Responsive to receiving input data from the user 400 which indicate that the user 400 wants to take a spherical immersive image without him/her being shown, the one or more processors 102 may be configured to determine, whether the user 400 is being shown in the respective preview image of the preview image stream. And, in the case that the user 400 is not shown in the preview image, the one or more processors 102 may control the (e.g., 3D) camera device 200 to captured the immersive image. The one or more processors 102 may be configured to determine, whether the user 400 is shown in a preview image, using information about the user 400 stored in the memory device. This information may be, for example, a face of the user 400, body characteristics of the user 400 (e.g., from various angles), etc. Thus, no timer may be required when capturing an immersive image without the user being shown. Although capturing an immersive image is illustratively described for the (e.g., 3D) camera device 200, it is understood that this applies analogously to any (e.g., monoscopic) camera device.

Some setups may be configured to take immersive images at a different time and these immersive images may be combined to a stereoscopic immersive image using a dedicated software (such as the smartphone app 3D Steroid Pro). A first image may be taken and the user 400 may be advices to shift the smartphone a little bit to the side without rotations to take the second image. In scenes without dynamic changes, the outcome can be a very good-looking 3D photo. However, as soon as people move, ocean waves move, vehicles move in that shot, the image will be mostly useless. This means that the left-eye image sees people, waves, or vehicles at one position, while the right-eye image sees them having moved already further. This easily leads to motion sickness and eye strain. Therefore, for such setups, the one or more processors 102 may be configured to track any dynamic changes (e.g., using the preview image stream) from starting with the first image. As an example, a warning may be given after 2% of the pixels in the scene are changed and error(s) may be given after 5% or 10% changed in the image, as examples. The control instructions 110 may also represent a suggestion to restart taking the first image.

Various aspects relate to the user device 500 being a head-mounted display (including the display device 302). The head-mounted display may include one or more facial tracking cameras. The one or more processors 102 may be configured to determine, based on data captured by the one or more facial tracking cameras, whether the user 400 is happy or unhappy and may adjust one or more settings of the (e.g., 3D) camera device 200 based thereon. For example, in the case that the automatic assistance automatically focuses on an object and that the user 400 smiles after, the one or more processors 102 may determine that the auto-focus assistance did the right focus.

Various aspects relate to an automatic assistance on presenting immersive images after capturing them. For example, the (e.g., 3D) camera device 200 may have an option to take a series of immersive images. For example, when pressing the shutter button longer, 10 images are taken within the closest possible time delay for the (e.g., 3D) camera device to process and save such images. Later, the photographer may be interested in which of the 10 images the best results occur. The one or more processors 102 may be configured to determine which of the 10 images has the least stitching artifacts. The one or more processors 102 may be configured to determine, whether some of the immersive images are associated with a pitch and/or roll rotation. The one or more processors 102 may be configured to determine a selection (e.g., three or four images) out of the (e.g., 10) captured immersive images to the user based on the above criteria. Further criteria may be, as detailed herein, the area size of lens flares, visible lens scratches and so on. This may apply similarly for capturing 3D-360° content and/or capturing 2D-360° content using one or two camera setups which are rotated on a tripod (as described below). Multiple lower field-of-view to 130° images may be taken for this. Here again, a series of images per partial image that would contribute to the final image after stitching. An example would be that in one perspective where the user 400 takes 10 images over 30 seconds, in some of them birds flew in the sky from left to right. As these might not match with the other images to stitch, the one or more processors 102 may rate the images without birds in the sky as a better choice and pre-select them for the user 400.

Various aspects relate to an automatic or feedback-based assistance which allows to capture immersive images in a manner that the immersive experience of a user is increased when later consuming the immersive images in a computer-simulated environment.

The one or more processors 102 may be configured to capture two or more stereoscopic immersive images using the first camera and the second camera of the one or more cameras 202. Each image of the two or more stereoscopic immersive images may be associated with a respective distance between the first camera and the second camera different from the distance associated with the other images of the two or more stereoscopic immersive images. It is understood that, to do so, the (e.g., 3D) camera device 200 may be configured such that the distance of the first camera (e.g., first camera lens) and the second camera (e.g., second camera lens) can be adjusted. According to various aspects, immersive images may be captured in predefined distance steps (of e.g., 2 mm or less, e.g., 1 mm) in a range from about 51 mm to about 77 mm (giving the range of human IPD).

Additionally or alternatively, the one or more processors 102 captured a plurality of stereoscopic immersive images using the first camera and the second camera of the one or more cameras 202 with each image of the plurality of stereoscopic immersive images being associated with a respective height of the first camera and the second camera different from the height associated with the other images of the plurality of stereoscopic immersive images. For example, the (e.g., 3D) camera device 200 may be mounted to a tripod or stick which is movable up and down.

This allows to user-specifically select which immersive image is to be shown to a user (e.g., the user 400 or another user) when he/she wants to view the immersive image: The one or more processors 102 may be configured to determine an interpupillary distance (IPD) of the user. The one or more processors 102 may be configured to determine which image of the two or more stereoscopic immersive images is associated with a distance between the first camera and the second camera closest to the IPD of the user and may then present this selected immersive image. The one or more processors 102 may be configured to determine a height of the user. The one or more processors 102 may be configured to determine which image of the plurality of stereoscopic immersive images is associated with a height of the first camera and the second camera closest to the height of the user and may then present this selected immersive image. According to some aspects, the IPD of the user and/or the height of the user may be stored in the memory device. According to other aspects, in the case that the user views the immersive images using a head-mounted display, sensors of the head-mounted display may detect the IPD of the user (e.g., using the one or more eye-tracking cameras 600) and/or the height of the user (e.g., one or more other cameras or other suitable sensors). For example, the head-mounted display may include sensors detecting the height of the head-mounted display. The height of the user may be derived from the height of the head-mounted display the user is wearing.

Additionally or alternatively, the one or more processors 102 captured a plurality of stereoscopic immersive images using the first camera and the second camera of the one or more cameras 202 with each image of the plurality of stereoscopic immersive images being associated with a respective focus depth of the first camera and the second camera different from the focus depth associated with the other images of the plurality of stereoscopic immersive images. This allows to user-specifically select which immersive image is to be shown to a user (e.g., the user 400 or another user) when he/she wants to view the immersive image. As described herein, the one or more processors 102 may be configured to determine (using the eye-tracking data from the one or more eye-tacking cameras 600) which focus depth the user is looking at. The one or more processors 102 may be configured to determine which image of the two or more stereoscopic immersive images is associated with a focus depth closest to the focus depth the user is looking at and may then present this selected immersive image. As an illustrative example, a user may wear a head-mounted display looking at a first focus depth in the foreground and a first immersive image having a close focus depth is provided to the user; when the user changes his/her focus to a second focus depth (different from the first focus depth) in the background, a second immersive image having a focus depth close to the second focus depth is provided to the user. For example, the one or more processors 102 may be configured to fade the first immersive image with the second immersive image.

Hence, the immersive experience of the user is improved. Usually, a distance of about 63 mm is used as distance between the first camera and the second camera since this refers to an average IPD of humans. However, in the case that a user has an IPD differing from this average by more than 3 mm, the immersive experience may be lowered a lot. Capturing several images at different distances between the first camera and the second camera allows to reduce the impact of (e.g., solve) this issue. The same applies to the height. In the case that a user is 1.5 m tall, the perspective of the captured scene gives a better immersive experience in the case that the immersive image is captured from about 1.5 m instead of being captured from about 1.8 m, as an illustrative example. Also, the immersive image having an improved focus depth can be provided, as described.

According to various aspects, the system 10 may include a motor configured to rotate the camera device 200 (e.g., when mounted on a tripod). The camera device 200 may be configured to capture a spherical)(360° immersive image via capturing two (e.g., 190° or 185°) half-spherical immersive images. The one or more processors 102 may be configured to control the motor. The one or more processors 102 may be configured to control (e.g., responsive to receiving corresponding instructions from the user 400) the motor and the camera device 200 such that the motor rotates the camera device 200 in predefined angle values from a first angle value to a second angle value different from the first angle value and that the camera device 200 captures a respective spherical immersive image at each angle value. Hence, a plurality of spherical immersive images may be taken (e.g., automatically) showing substantially a same scene (e.g., a hotel room, a flat, etc.). As described herein, there may be issues when stitching the two half-spherical immersive images to the spherical immersive image. The one or more processors 102 may be configured to detect objects in the stitching area, as described herein, and may be configured to select one or more spherical immersive images of the plurality of spherical immersive images having the least stitching issues (e.g., stitching artifacts).

Although various aspects exemplarily describe that a stereoscopic immersive image may be captured with a first camera and a second camera, it is understood that a stereoscopic immersive image may also be captured using a single camera. In this case, the system 10 may be configured such that the camera (e.g., the camera device 200) can be (e.g., automatically) moved (e.g., using one or more motors) (e.g., by a predefined distance) to captured the two images of the stereoscopic immersive image one after another.

According to various aspects, system 10 may allow to set an assistance mode, such as beginner mode or expert mode. Issues which are related to how to take the immersive image may only be provided to the user 400 (e.g., shown in display device 302) in the beginner mode, whereas issues related to the (e.g., 3D) camera device 200 (e.g., raindrops, dust, and/or fingerprint on a lens, lens defects, etc.) may be provided to the user 400 (e.g., shown in display device 302) in both, the beginner mode and the expert mode.

Figure 6:
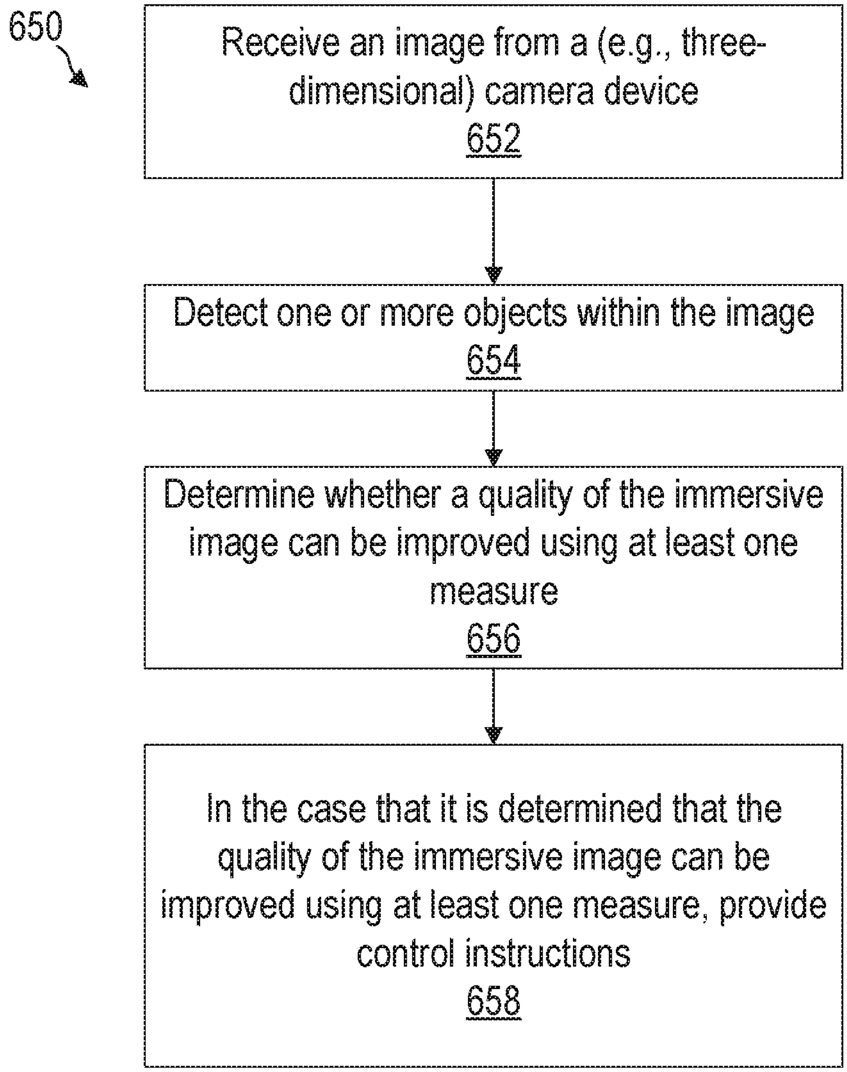
FIG. 6 shows a flow diagram of a method for improving the quality when capturing immersive images according to various aspects.

FIG. 6 shows a flow diagram of a method 650 for improving the quality when capturing immersive images according to various aspects. The method 650 may include receiving an image from a (e.g., three-dimensional) camera device (in 652). The image may be an already captured immersive image or a (e.g., two-dimensional or three-dimensional) preview of the immersive image. The method 650 may include detecting one or more objects within the image (in 654). The objects may be detected as described herein. The method 650 may include determining, based on the detected one or more objects, whether a quality of the immersive image can be improved using at least one measure of one or more predefined measures (in 656). For example, it may be determined whether there are one or more issues within the immersive image 204, as described herein. The method 650 may include in the case that it is determined that the quality of the immersive image can be improved using at least one measure of the one or more predefined measures, providing control instructions (in 658). The control instructions may be control instructions for an automatic control of the (e.g., three-dimensional) camera device, as described herein. The control instructions may (in the case of a feedback-based assistance) be control instructions for controlling the one or more output devices to output information informing a user that the at least one measure can improve the quality when capturing an immersive image.

Figure 7A:
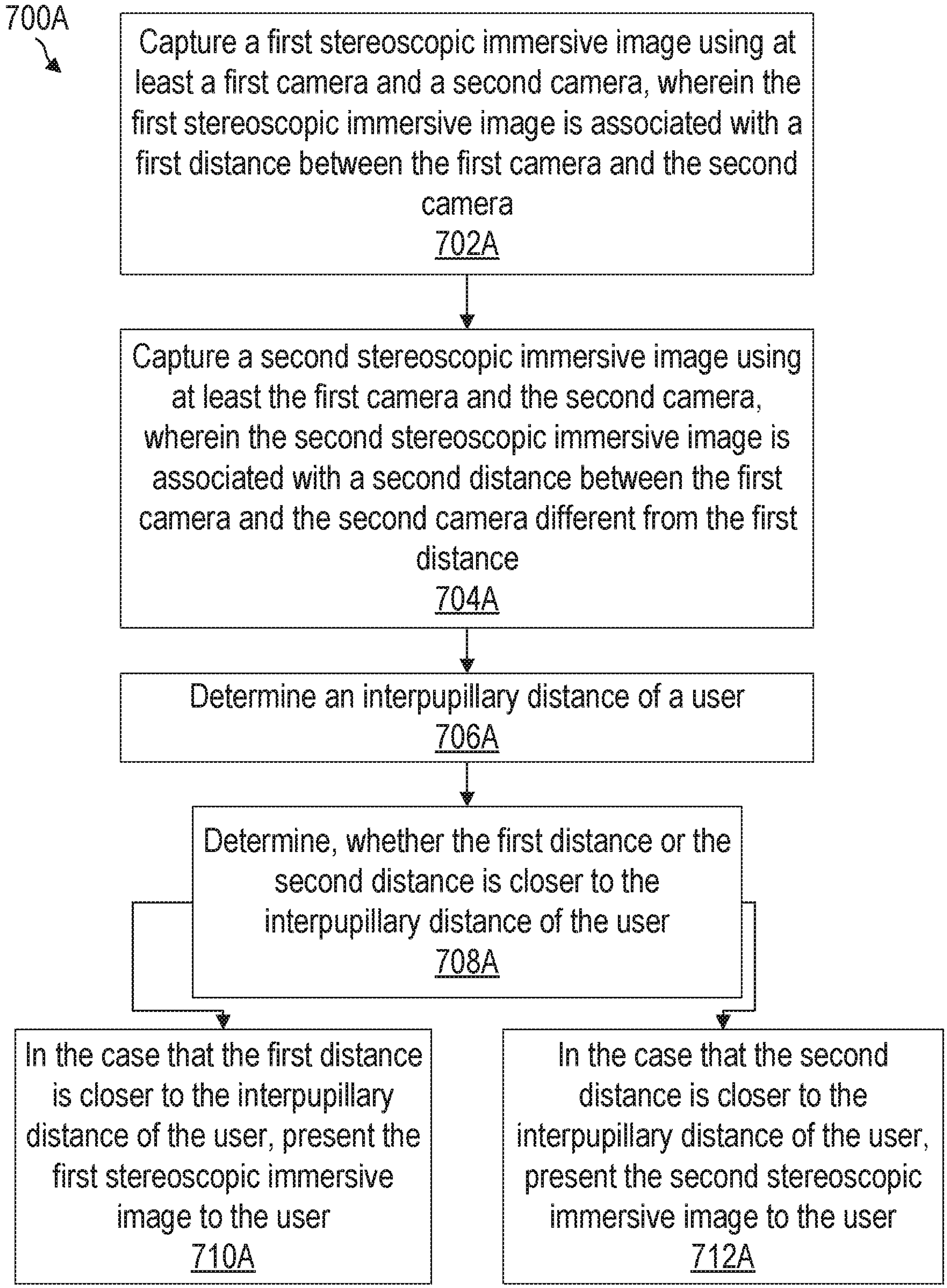
FIG. 7A and FIG. 7B each show a flow diagram of a method for user-specifically presenting an immersive image according to various aspects.

FIG. 7A shows a flow diagram of a method 700A for user-specifically presenting an immersive image according to various aspects. The method 700A may include capturing a first stereoscopic immersive image using at least a first camera and a second camera, wherein the first stereoscopic immersive image is associated with a first distance between the first camera and the second camera (in 702A). The method 700A may include capturing a second stereoscopic immersive image using at least the first camera and the second camera, wherein the second stereoscopic immersive image is associated with a second distance between the first camera and the second camera different from the first distance (in 704A). The method 700A may include determining an interpupillary distance of a user (in 706A). The method 700A may include determining, whether the first distance or the second distance is closer to the interpupillary distance of the user (in 708A). The method 700A may include in the case that the first distance is closer to the interpupillary distance of the user, presenting the first stereoscopic immersive image to the user (in 710A). The method 700A may include, in the case that the second distance is closer to the interpupillary distance of the user, presenting the second stereoscopic immersive image to the user (in 712A).

Figure 7B:
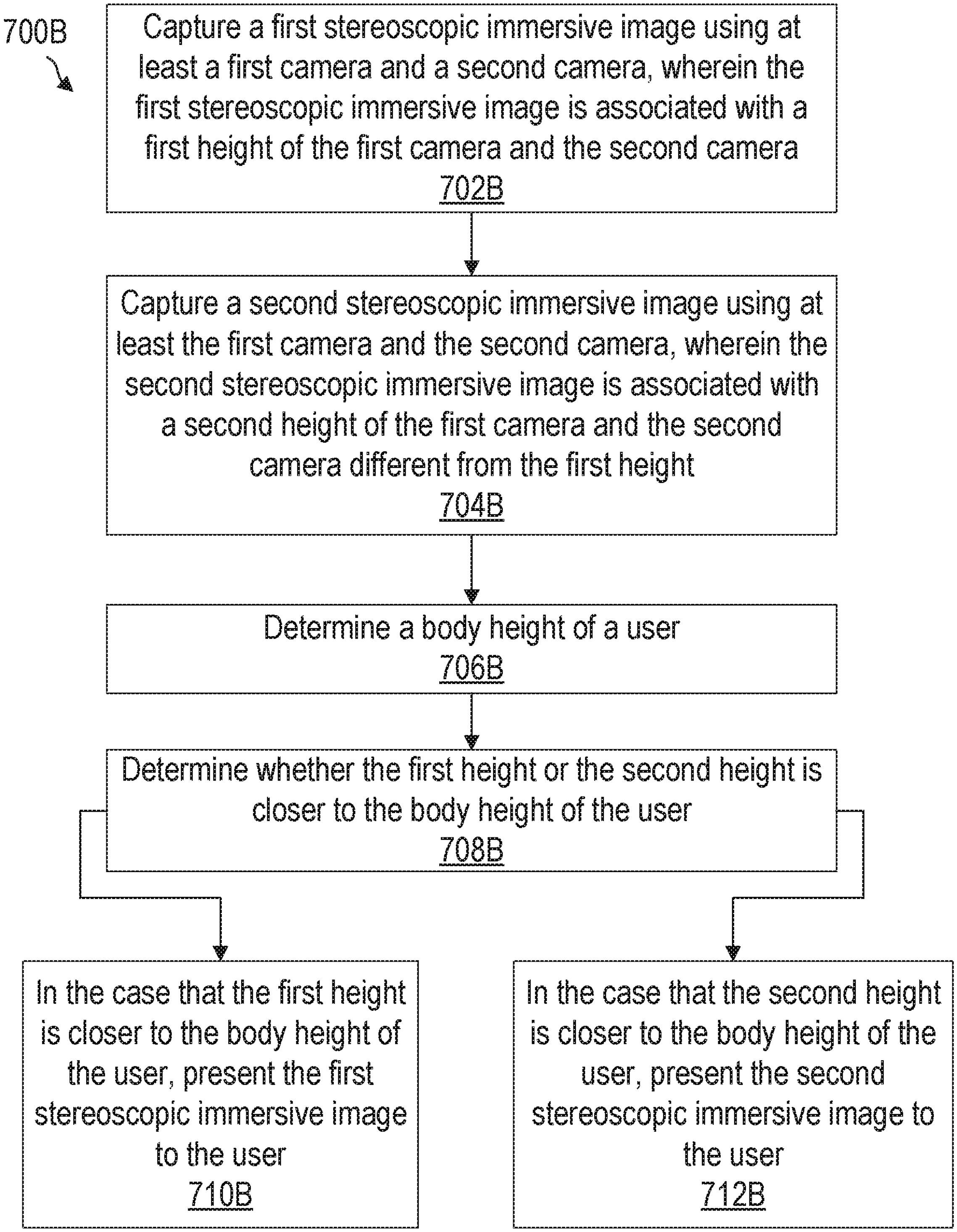

FIG. 7B shows a flow diagram of a method 700B for user-specifically presenting an immersive image according to various aspects. The method 700B may include capturing a first stereoscopic immersive image using at least a first camera and a second camera, wherein the first stereoscopic immersive image is associated with a first height of the first camera and the second camera (in 702B). The method 700B may include capturing a second stereoscopic immersive image using at least the first camera and the second camera, wherein the second stereoscopic immersive image is associated with a second height of the first camera and the second camera different from the first height (in 704B). The method 700B may include determining a body height of a user (in 706B). The method 700B may include determining, whether the first height or the second height is closer to the body height of the user (in 708B). The method 700B may include, in the case that the first height is closer to the body height of the user, presenting the first stereoscopic immersive image to the user (in 710B). The method 700B may include, in the case that the second height is closer to the body height of the user, presenting the second stereoscopic immersive image to the user (in 712B).

As described herein, it is understood that, when a processing of the image is described, this processing may be carried out directly on the image, after converting the image into another format, or on a plurality of two-dimensional images which are generated from the immersive image using tessellation. In the following, such a generation of the plurality of two-dimensional images from an immersive image is described:

An immersive image may represent a predefined number of degrees of a sphere which are filled with content, as described herein. Hence, an immersive image (e.g., the immersive image 204) may be associated with at least a portion of the sphere (e.g., with a portion of the sphere, such as a half sphere, or with the full sphere). The one or more processors 102 may be configured to tessellate at least the portion of the sphere into a plurality of polygons. A tessellation, as described herein, may be understood as fully dividing the associated portion of the sphere or the full sphere into disjoint (e.g., non-overlapping) polygons. The plurality of polygons may include different types of polygons or the same type of polygons. According to various aspects, the polygons of the plurality of polygons may be the same type of polygon, i.e., having the same number of sides and edges. However, dimensions of one or more polygons of the plurality of polygons may be different from the other polygons. For example, some polygons may be larger or smaller than one or more other polygons. For example, some polygons may have a different shape (e.g., different angles between their sides). It is understood that the polygons of the plurality of polygons may also have the same dimensions. The one or more processors 102 may be configured to tessellate at least the portion of the sphere into the plurality of polygons such that each polygon of the plurality of polygons corresponds to a respective part of the immersive image 204.

Figure 5A:
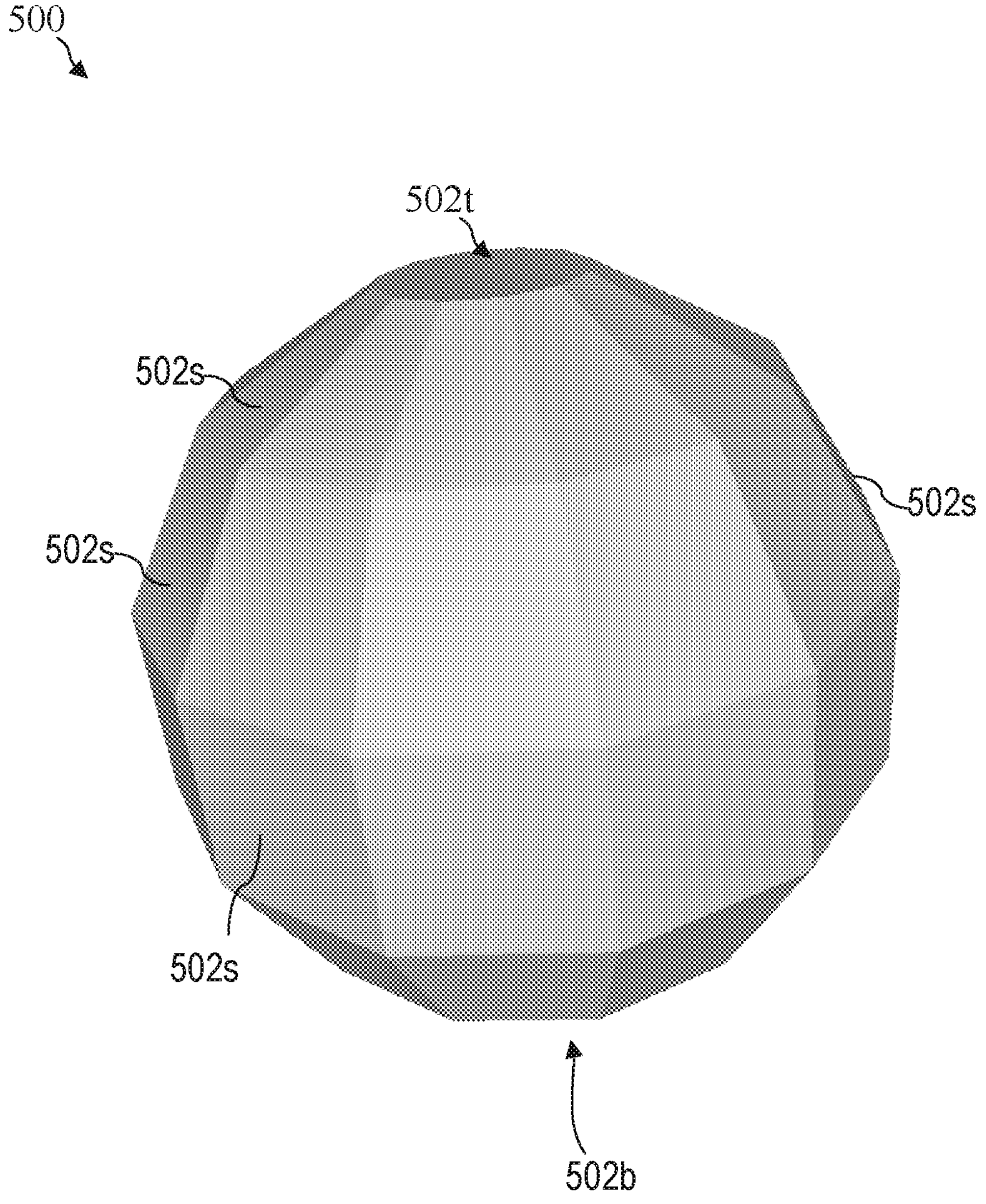
FIG. 5A and FIG. 5B show an exemplary tessellation of a sphere into a plurality of polygons according to various aspects.

An exemplarily tessellated full-sphere 500 according to various aspects is shown in FIG. 5A. The tessellated full-sphere 500 may be tessellated into the plurality of polygons. The plurality of polygons may include a top polygon 502*t*, a bottom polygon 502*b*, and side-on polygons 502*s*. According to various aspects, each side-on polygon 502*s* (i.e., each polygon of the plurality of polygons except for the top polygon 502*t* and the bottom polygon 502*b*) may be of the same type of polygon. According to various aspects, each side-on polygon 502*s* may be a quadrilateral (i.e., having four edges and four sides). Illustratively, the full-sphere 500 may be tessellated into a polyhedron with quadrilateral faces. It is noted that for the purpose of processing the one or more processors 102 may be configured to tessellate the sphere (e.g., the portion of the sphere or the full sphere) into triangles, wherein two (or more) neighboring triangles form the respective polygon, such as the quadrilateral. According to various aspects, each quadrilateral described herein may be formed by two triangles. A quadrilateral may be, for example, a rectangle, trapezoid, a parallelogram, a rhombus, etc.

In the case of tessellating the full sphere, the plurality of polygons may include a number of polygons in the range from about 12 to about 50 (e.g., in the range from about 30 to about 50).

The one or more processors 102 may be configured to, for one or more polygons (e.g., for each polygon) of the plurality of polygons, project at least the corresponding part of the immersive image 204 onto the sphere and generate a respective perspective image representing at least the corresponding part of the immersive image 204. A perspective image, as used herein, may refer to a two-dimensional image. Illustratively, the immersive image 204 may represent a portion of the sphere or the full sphere and the one or more processors 102 may tessellate this portion or full sphere into the plurality of polygons such that each polygon represents a corresponding part of the immersive image 204; then the one or more processors 102 may generate, for one or more of the polygons (each for each polygon), a respective perspective image which shows at least this corresponding part of the immersive image 204.

According to various aspects, the one or more processors 102 may be configured to process the immersive image 204 in the Equirectangular format. For example, in the case that the immersive image 204 has a format different from the Equirectangular format, the one or more processors 102 may be configured to convert the immersive image 204 into the Equirectangular format (e.g., using any kind of map projection) prior to processing the immersive image 204 in the context of tessellation.

According to some aspects, each generated perspective image may represent (e.g., show) only the corresponding part of the immersive image 204. Hence, in this case, there may be no overlap between the content of images generated for neighboring polygons. According to other aspects, each generated perspective image may represent (e.g., show) the corresponding part of the immersive image 204 and an additional part of the immersive image 204 surrounding the corresponding part. In this case, there may be an overlap between the content of perspective images generated for neighboring polygons. This may improve a subsequent object detection since objects may be shown completely whereas in the case of no overlap, objects which are present at border(s) between two or more neighboring polygons, may be shown in the perspective images only in part, thereby, reducing the probability of a correct classification via (semantic) image segmentation. Hence, in the case that each generated perspective image represents (e.g., shows) the corresponding part and the additional part of the immersive image 204, the accuracy of the subsequent (semantic) image segmentation is improved. In the case that the generated perspective image represents the corresponding part of the immersive image 204, the polygon may be a rectangle such that the perspective image is a rectangular perspective image. In the case that the generated perspective image represents the corresponding part and the additional part of the immersive image, the area covered by the corresponding part and the additional part may be rectangular such that the perspective image is a rectangular perspective image.

A ratio between an area of the corresponding part of the immersive image 204 and an area of the additional part (surrounding the corresponding part) of the immersive image 204 may be in the range from about 1.4 to about 3.1. Hence, each side of the respective (e.g., rectangular) perspective image may be greater than the side of the corresponding polygon (e.g., the corresponding quadrilateral) by about 15% to about 30%. As an example, the one or more processors 102 may be configured to generate a frame, for example a rectangular frame, surrounding the (e.g., rectangular) polygon. The edges of the frame may extend from the edge of the polygon by about 15% to about 30% of the length of the respective edge of the polygon. The perspective image may represent the area covered by the polygon and the frame.

For example, the polygon may be rectangle covering an area of 800 pixels times 400 pixels of the immersive image 104*i*. In the case that the edges of the frame extend from the edge of the rectangle by 15% (e.g., by 7.5% in each dimension of each edge), the frame covers an area of 920 pixels times 460 pixels minus the area covered by the rectangle resulting in 103200 additional pixels. Hence, the ratio between the area covered by the rectangle and the area covered by the frame may be:

$$\frac{800*400}{(920*460)-(800*400)} \approx 3.10$$

In the case that the edges of the frame extend from the edge of the rectangle by 30% (e.g., by 15% in each dimension of each edge), the frame covers an area of 1040 pixels times 520 pixels minus the area covered by the rectangle resulting in 220800 additional pixels. Hence, the ratio between the area covered by the rectangle and the area covered by the frame may be:

$$\frac{800*400}{(1040*520)-(800*400)}\approx 1.45$$

Figure 5B:
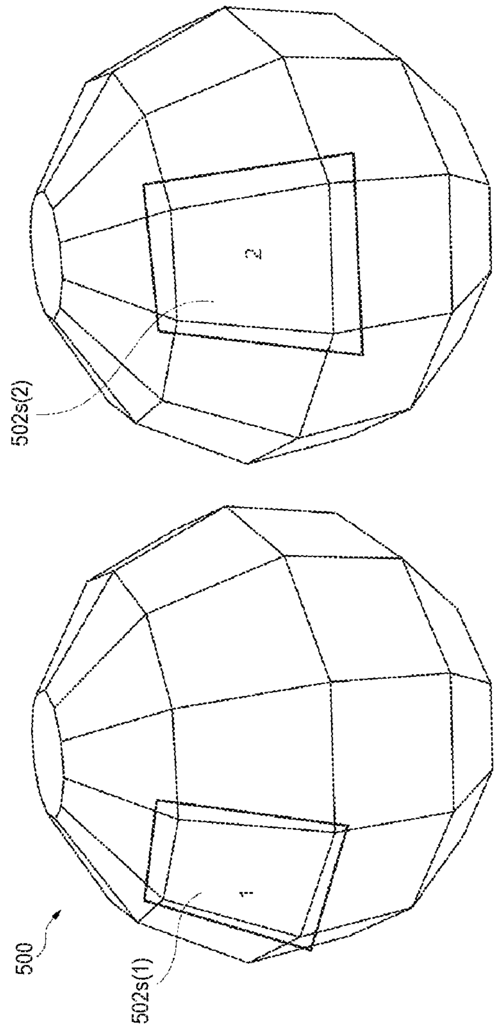
Figure 5C:
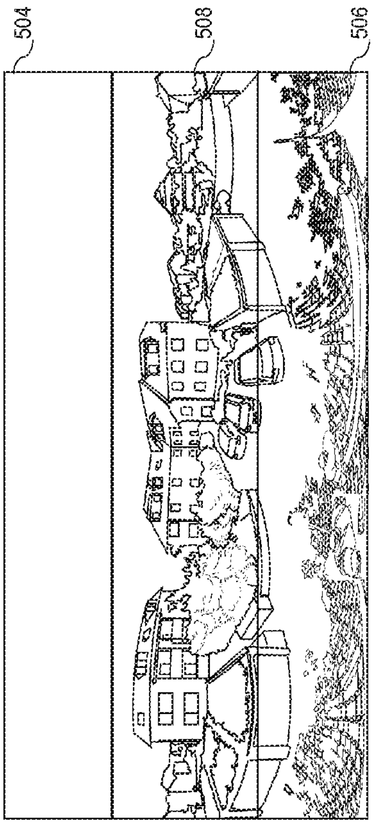
FIG. 5C shows an immersive image divided into an upper edge region, a lower edge region, and a center region according to various aspects.

FIG. 5B shows the exemplarily tessellated full-sphere 300. As shown on the left, a first perspective image 1 may be generated which shows, for a first side-on polygon 502*s*(1), the corresponding part and the additional part of the immersive image 204. As shown on the right, a second perspective image 2 may be generated which shows, for a second side-on polygon 502*s*(2), the corresponding part and the additional part of the immersive image 204. Illustratively, there may be a part of the immersive image 204 which may be represented (e.g., shown) by the first perspective image 1 and the second perspective image 2. A respective perspective image may be generated for each polygon of the plurality of polygons. Illustratively, the sphere may be "peeled like an onion". According to various aspects, a respective quadrilateral perspective image may be generated for the top polygon and the bottom polygon. These quadrilateral perspective images may have some overlap with the perspective images generated for each of the neighboring side-on polygons.

Illustratively, the one or more processors 102 may be configured to generate one or more perspective images (e.g., a plurality of perspective images) which represent a part of the immersive image 204 or the complete immersive image 204 two-dimensionally.

As described herein, an immersive image, such as the immersive image 204, may have an Equirectangular format, a Fisheye format, or a Cubemap format. According to some aspects, the one or more processors 102 may be configured to generate the perspective images directly from immersive image 204 having the respective format by projecting the immersive image 204 onto the sphere and generating the perspective image accordingly. According to other aspects, the one or more processors 102 may be configured to convert the immersive image 204 to another format prior to generating the perspective images. For example, the immersive image 204 may have a Fisheye format and the one or more processors 102 may be configured to convert the Fisheye format into an Equirectangular format prior to projecting at least the corresponding part of the immersive image associated with a respective polygon onto the sphere and generating the respective perspective image representing at least the corresponding part of the immersive image.

Figure 5D:
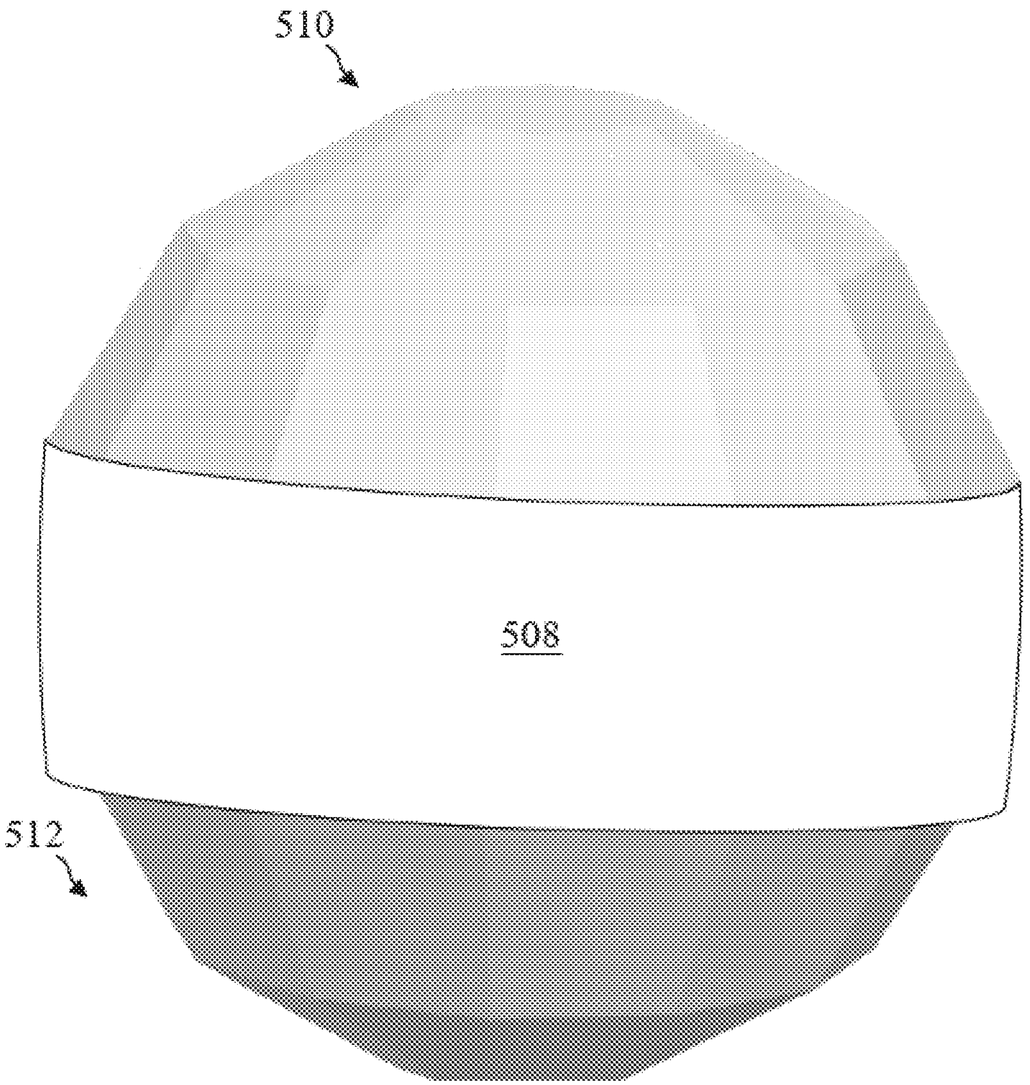
FIG. 5D shows a tessellation of a portion of a sphere into a plurality of polygons according to various aspects, wherein the portion corresponds to the upper edge region and the lower edge region of FIG. 5C.

As shown in FIG. 3D, the lower edge region and the upper edge region of an immersive image having the Equirectangular format may be highly distorted (e.g., stretched) as compared to a center portion of the immersive image (see distortions 302 in FIG. 3D). According to various aspects, in the case that the immersive image 204 has the Equirectangular format (or is converted into the Equirectangular format), the one or more processors 102 may be configured to divide the immersive image 204 into an upper edge region, a lower edge region, and a center region and may generate the perspective images for the (e.g., distorted) upper edge region and lower edge region. As exemplarily shown in FIG. 5C, the one or more processors 102 may (disjointly) divide the immersive image 350D into upper edge region 504, the lower edge region 506, and the center region 508 located between the upper edge region 504 and the lower edge region 506. The respective size of the upper edge region 504, the lower edge region 506, and the center region 508 may be predefined (e.g., as respective percentage in height direction or as relation to each other). The upper edge region 504 of the immersive image 350D may be associated with an upper region of the sphere and the lower edge region 506 may be associated with a lower region of the sphere. As shown in FIG. 5D, the one or more processors 102 may be configured to tessellate an upper region 510 of the sphere which is associated with the upper edge region 504 and a lower region 512 of the sphere which is associated with the lower edge region 506 into the plurality of polygons. The one or more processors 102 may be configured to generate the perspective images for the plurality of polygons as described herein and may apply a selected two-dimensional image processing algorithm (e.g., a two-dimensional semantic image segmentation algorithm or any other algorithm for detecting objects within the respective perspective image) on each perspective image. According to various aspects, the selected two-dimensional image processing algorithm (e.g., the two-dimensional semantic image segmentation algorithm) may be applied directly on the center region 508 of the immersive image. Since the center regions includes a lower amount of distortions 302, the selected two-dimensional image processing algorithm may be capable to process this part of the immersive image directly without generating one or more perspective images of this part first. This may reduce the processing cost, such as the processing cost for detecting the one or more objects within the immersive image 204.

The term "circuit", as used herein, may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. The term "processor" may be understood as any kind of entity capable to process data and/or signals. For example, the data or signals may be handled according to at least one (i.e., one or more than one) specific function performed by the processor. A processor may include or may be an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof. Any other method of implementing the respective functions, described in more detail below, may also be understood to include a processor or logic circuit. It is understood that one or more of the method steps described in detail herein may be carried out (e.g., implemented) by a processor, through one or more specific functions performed by the processor. The processor may therefore be arranged to carry out any of the information processing methods or components thereof described herein.

The term "memory", as used herein, may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Furthermore, it is appreciated that registers, shift registers, processor registers, data buffers, among others, are also embraced herein by the term memory. It is also appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

In the following, various aspects of this disclosure will be illustrated. It is noted that aspects described with reference to a device or a system may be accordingly implemented in a method and vice versa. Further, it is understood that one or more processors described with reference to a system may be, where applicable, configured in accordance with one or more processors described with reference to a device, and vice versa.

Example 1 is a device including: one or more processors configured to: receive an image from a (e.g., three-dimensional) camera device, the image being an immersive image or a (e.g., two-dimensional or three-dimensional) preview of the immersive image; detect one or more objects within the image; determine, based on the detected one or more objects, whether a quality of the immersive image can be improved using at least one measure of one or more predefined measures; and in the case that it is determined that the quality of the immersive image can be improved using at least one measure of the one or more predefined measures, provide control instructions to one or more output devices to control the one or more output devices to output information informing a user that the at least one measure can improve the quality when capturing an immersive image.

In Example 2, the subject matter of Example 1 can optionally include that the image is a stereoscopic image including a first image associated with a first lens of the (e.g., three-dimensional) camera device and a second image associated with a second lens of the (e.g., three-dimensional) camera device; and wherein the one or more processors configured to: detect one or more first objects within the first image and one or more second objects within the second image; determine, by comparing the one or more first objects with the one or more second objects, whether the first image or the second image shows at least one object not shown in the other one; in the case that it is determined that the first image or the second image shows at least one object not shown in the other one, determine that the quality of the immersive image can be improved; determine a type of the at least one object; and determine, based on the type of the at least one object, the at least one measure of one or more predefined measures with which the quality of the immersive image can be improved.

In Example 3, the subject matter of Example 2 can optionally include that the one or more processors are configured to: determine a depth map using the stereoscopic image, the depth map including depth information regarding the one or more objects detected within the image; determine, whether the depth map includes an erroneous depth for the at least one object; and in the case that it is determined that the depth map includes an erroneous depth for the at least one object, determine the first image or the second image shows at least one object not shown in the other one.

In Example 4, the subject matter of Example 2 or 3 can optionally include that the one or more processors are configured to: determine, whether the at least one object has an ellipsoidal (e.g., circular) shape; in the case that it is determined that the at least one object has an ellipsoidal shape, determine, whether there is color fringing at a border of the at least one object; and in the case that it is determined that the at least one object has an ellipsoidal shape with color fringing at a border of the at least one object, determine a drop of a liquid (e.g., a raindrop) as the type of the at least one object.

In Example 5, the subject matter of Example 4 can optionally include that the one or more processors are configured to: in the case that it is determined that the at least one object has an ellipsoidal shape but no color fringing at a border of the at least one object, determine the type of the at least one object to be a dust particle or a fingerprint.

In Example 6, the subject matter of Example 4 or 5 can optionally include that the one or more processors are configured to: in the case that it is determined that the first image shows the at least one object not shown in the second image, determine that, as a measure of the one or more predefined measures, the quality of the immersive image can be improved by cleaning the first lens; and in the case that it is determined that the second image shows the at least one object not shown in the first image, determine that, as a measure of the one or more predefined measures, the quality of the immersive image can be improved by cleaning the second lens.

In Example 7, the subject matter of any one of Examples 2 to 6 can optionally include that the one or more processors are configured to: determine, whether the at least one object is star-shaped or includes one or more circular rings; in the case that it is determined that the at least one object is star-shaped or includes one or more circular rings, determine a lens flare as the type of the at least one object.

In Example 8, the subject matter of Example 7 can optionally include that the one or more processors are configured to: receive a further stereoscopic image from the (e.g., three-dimensional) camera device, wherein the further stereoscopic image includes a further first image associated with the first lens and a further second image associated with the second lens, wherein the stereoscopic image is associated with a first orientation of the (e.g., three-dimensional) camera device, and wherein the further stereoscopic image is associated with a second orientation of the (e.g., three-dimensional) camera device different from the first orientation (e.g., detected using one or more inertial measurement units); detect one or more further first objects within the further first image of the further stereoscopic image and one or more further second objects within the further second image of the further stereoscopic image; in the case that it is determined that the first image of the stereoscopic image shows the at least one object not shown in the second image: determine, whether the further first image of the further stereoscopic image shows the at least one object at a different position, and in the case that it is determined that the further first image of the further stereoscopic image shows the at least one object at a different position, determine a lens flare of the first lens as the type of the at least one object; in the case that it is determined that the second image of the stereoscopic image shows the at least one object not shown in the first image: determine, whether the further second image of the further stereoscopic image shows the at least one object at a different position, and in the case that it is determined that the further second image of the further stereoscopic image shows the at least one object at a different position, determine a lens flare of the second lens as the type of the at least one object.

In Example 9, the subject matter of any one of Examples 2 to 8 can optionally include that the one or more processors are configured to: determine, whether the at least one object includes one or more lengthy stripes associated with a bright light source; in the case that it is determined that the at least one object includes one or more lengthy stripes associated with a bright light source, determine light rays as the type of the at least one object.

In Example 10, the subject matter of Example 9 can optionally include that the one or more processors are configured to: in the case that it is determined that the at least one object includes one or more lengthy stripes associated with a bright light source, determine, whether an object in a surrounding of the at least one object is associated with a sky (e.g., a cloud); and in the case that it is determined that the at least one object includes one or more lengthy stripes associated with a bright light source and that an object in the surrounding of the at least one object is associated with the sky, determine crepuscular rays (god rays) as the type of the at least one object.

In Example 11, the subject matter of Example 10 can optionally include that the one or more processors are configured to: in the case that it is determined that the at least one object includes one or more lengthy stripes associated with a bright light source and that no object in the surrounding of the at least one object is associated with the sky, determine reflected sun rays as the type of the at least one object.

In Example 12, the subject matter of any one of Examples 7 to 11 can optionally include that the one or more processors are configured to, in the case that lens flare or light rays (e.g., sun rays or god rays) is determined as type of the at least one object, determine that, as a measure of the one or more predefined measures, the quality of the immersive image can be improved by moving and/or rotating the (e.g., three-dimensional) camera device.

In Example 13, the subject matter of any one of Examples 7 to 12 can optionally include that the one or more processors are configured to: in the case that lens flare or sun rays is determined as type of the at least one object, determine, whether the one or more objects include a further object which is larger than the at least one object and in a surrounding of the at least one object; in the case that it is determined that the one or more objects include a further object which is larger than the at least one object and in its surrounding, determine that, as a measure of the one or more predefined measures, the quality of the immersive image can be improved by moving the camera such that the further object is located between the (e.g., three-dimensional) camera device and the at least one object.

In Example 14, the subject matter of any one of Examples 2 to 13 can optionally include that the one or more processors are configured to: determine, whether the at least one object is close to a corresponding lens of the first lens and the second lens but not directly at the corresponding lens (e.g., the at least one object being an insect or a pollen particle); in the case that it is determined that the at least one object is close to but not at the corresponding lens, determine that, as a measure of the one or more predefined measures, the quality of the immersive image can be improved by capturing the immersive image after a waiting time period and/or by moving the (e.g., three-dimensional) camera device.

In Example 15, the subject matter of any one of Examples 2 to 14 can optionally include that the one or more processors are configured to: determine, whether the at least one object is associated with a moving object (e.g., a bird, a plane, a drone, etc.) in a background of the image; and in the case that it is determined that the at least one object is associated with a moving object in the background of the image, determine that, as a measure of the one or more predefined measures, the quality of the immersive image can be improved by capturing the immersive image after a waiting time period.

In Example 16, the subject matter of any one of Examples 2 to 15 can optionally include that the one or more processors are configured to: determine, based on a size of the at least one object and/or a one or more color values associated with the at least one object, whether the at least one object is a portion of a finger; and in the case that it is determined that the at least one object is a portion of a finger, determine that, as a measure of the one or more predefined measures, the quality of the immersive image can be improved by removing the finger from the corresponding lens.

In Example 17, the subject matter of any one of Examples 2 to 16 can optionally include that the one or more processors are configured to: receive a plurality of further stereoscopic images from the (e.g., three-dimensional) camera device, each further stereoscopic image of the plurality of further stereoscopic images including a first image associated with the first lens of the (e.g., three-dimensional) camera device and a second image associated with the second lens of the (e.g., three-dimensional) camera device, wherein each stereoscopic image of the plurality of further stereoscopic images is associated with a respective position and/or rotation of the (e.g., three-dimensional) camera device, and wherein the position and/or the rotation varies among stereoscopic image and the plurality of further stereoscopic images; for each further stereoscopic image of the plurality of further stereoscopic images, detect one or more first objects within the first image and one or more second objects within the second image; determine, whether the first image of the stereoscopic image and one or more (e.g., each) first images of the plurality of further stereoscopic images shows at least one same object at a substantially same position; and in the case that it is determined that the first image of the stereoscopic image and one or more first images of the plurality of further stereoscopic images shows at least one same object at a substantially same position, determine a lens defect of the first lens as the type of the at least one object.

In Example 18, the subject matter of Example 17 can optionally include that the one or more processors are configured to: determine, whether the second image of the stereoscopic image and one or more (e.g., each) second images of the plurality of further stereoscopic images shows at least one same object at a substantially same position; and in the case that it is determined that the second image of the stereoscopic image and one or more second images of the plurality of further stereoscopic images shows at least one same object at a substantially same position, determine a lens defect of the second lens as the type of the at least one object.

In Example 19, the subject matter of Example 18 can optionally include that the one or more processors are configured to: in the case that a lens defect of the first lens is determined as the type of the at least one object, determine that, as a measure of the one or more predefined measures, the quality of the immersive image can be improved by repairing and/or replacing the first lens; and/or in the case that a lens defect of the second lens is determined as the type of the at least one object, determine that, as a measure of the one or more predefined measures, the quality of the immersive image can be improved by repairing and/or replacing the second lens.

In Example 20, the subject matter of any one of Examples 2 to 19 can optionally include that the one or more processors are configured to determine, whether the first image or the second image shows at least one object not shown in the other one by determining a respective difference for each pixel of the first image and the second image, wherein determining a difference of a respective pixel between the first image and the second image includes: determining a difference between a color value of the respective pixel in the first image and a color value of the respective pixel in the second image, and in the case that the difference between the color value of the respective pixel in the first image and the color value of the respective pixel in the second image is equal to or greater than a predefined color threshold value, determine that the first image or the second image shows at least one object not shown in the other one.

In Example 21, the subject matter of any one of Examples 1 to 20 can optionally include that the one or more processors are configured to: determine a depth map using the stereoscopic image, the depth map including depth information regarding the one or more objects detected within the image.

In Example 22, the subject matter of Example 21 can optionally include that the one or more processors are configured to: determine, using the depth map (and optionally an interpupillary distance of the user), whether each object of the one or more objects has a distance to the (e.g., three-dimensional) camera device equal to or greater than a predefined minimum distance value; and in the case that it is determined that at least one object of the one or more objects has a distance to the (e.g., three-dimensional) camera device less than the predefined minimum distance value, determine that, as a measure of the one or more predefined measures, the quality of the immersive image can be improved by moving the (e.g., three-dimensional) camera device further away from the at least one object.

In Example 23, the subject matter of Example 21 or 22 can optionally include that the one or more processors are configured to: determine, using the depth map (and optionally an interpupillary distance of the user), for each object of the one or more objects a respective distance to the (e.g., three-dimensional) camera device; determine a distance difference between a distance associated with an object of the one or more objects furthest away from the (e.g., three-dimensional) camera device and a distance associated with an object of the one or more objects closest to the (e.g., three-dimensional) camera device; determine, whether the distance difference is greater than a predefined upper distance threshold value; and in the case that it is determined that the distance difference is greater than the predefined upper distance threshold value, determine that, as a measure of the one or more predefined measures, the quality of the immersive image can be improved by moving the (e.g., three-dimensional) camera device.

In Example 24, the subject matter of Example 23 can optionally include that the one or more processors are configured to: determine, whether the distance difference is equal to or less than a predefined lower distance threshold value; and in the case that it is determined that the distance difference is equal to or less than the predefined lower distance threshold value, determine that, as a measure of the one or more predefined measures, the quality of the immersive image can be improved by moving the (e.g., three-dimensional) camera device to increase the overall depth variation.

In Example 25, the subject matter of any one of Examples 1 to 24 can optionally include that the one or more processors are configured to detect the one or more objects within the image using semantic image segmentation.

In Example 26, the subject matter of Examples 2 and 25 can optionally include that the one or more processors are configured to determine the type of the at least one object using the semantic image segmentation.

In Example 27, the subject matter of Example 26 can optionally include that the one or more processors are configured to: determine, whether at least one object of the one or more objects is associated with a predefined object of interest (e.g., a person, a face of a person, etc.); in the case that it is determined that at least one object of the one or more objects is associated with a predefined object of interest, determine, whether the at least object is located in a center portion of the image; and in the case that it is determined that the at least object is not located in the center portion of the image, determine that, as a measure of the one or more predefined measures, the quality of the immersive image can be improved by moving the (e.g., three-dimensional) camera device such that the at least one object is located in the center portion of the image.

In Example 28, the subject matter of any one of Examples 1 to 27 can optionally include that the one or more processors are configured to: determine, whether at least one object of the one or more objects is associated with a reflection (e.g., a specular highlight); and in the case that it is determined that at least one object of the one or more objects is associated with a reflection, determine that, as a measure of the one or more predefined measures, the quality of the immersive image can be improved by moving (e.g., three-dimensional) camera device.

In Example 29, the subject matter of any one of Examples 1 to 28 can optionally include that the one or more processors are configured to: determine, whether at least one object of the one or more objects is associated with a Moiré effect; and in the case that it is determined that at least one object of the one or more objects is associated with a Moiré effect, determine that, as a measure of the one or more predefined measures, the quality of the immersive image can be improved by moving further away from or closer to the at least one object and/or by moving to change an angle to the at least one object.

In Example 30, the subject matter of any one of Examples 1 to 29 can optionally include that the one or more processors are configured to: determine, whether at least one object of the one or more objects is associated with a tripod; and in the case that it is determined that at least one object of the one or more objects is associated with a tripod, determine that, as a measure of the one or more predefined measures, the quality of the immersive image can be improved by changing to a setup in which no tripod is visible when capturing an immersive image.

In Example 31, the subject matter of any one of Examples 1 to 30 can optionally include that the immersive image is a spherical immersive image which include a first half-spherical immersive image having a Fisheye format and a second half-spherical immersive image having the Fisheye format; wherein the one or more processors are configured to: determine, whether there is at least one object of the one or more objects of which a first portion is shown in the first half-spherical immersive image and a second portion is shown in the second half-spherical immersive image; in the case that it is determined that there is at least one object of which a first portion is shown in the first half-spherical immersive image and a second portion is shown in the second half-spherical immersive image, determine, whether the at least one object is associated with a face or with written text; and in the case it is determined that the at least one object is associated with a face or with written text, determine that, as a measure of the one or more predefined measures, the quality of the immersive image can be improved by rotating the (e.g., three-dimensional) camera device such that the at least one object is completely within the first half-spherical immersive image or the second half-spherical immersive image.

Example 32 is a method for user-specifically presenting an immersive image, the method including: capturing a first stereoscopic immersive image using at least a first camera and a second camera, wherein the first stereoscopic immersive image is associated with a first distance between the first camera and the second camera; capturing a second stereoscopic immersive image using at least the first camera and the second camera, wherein the second stereoscopic immersive image is associated with a second distance between the first camera and the second camera different from the first distance; determining an interpupillary distance of a user; determining, whether the first distance or the second distance is closer to the interpupillary distance of the user; in the case that the first distance is closer to the interpupillary distance of the user, presenting the first stereoscopic immersive image to the user; and in the case that the second distance is closer to the interpupillary distance of the user, presenting the second stereoscopic immersive image to the user.

In Example 33, the subject matter of Example 32 can optionally include that the first stereoscopic immersive image and the second stereoscopic immersive image are associated with a first height of the first camera and the second camera; and wherein the method further includes: capturing, at a second height different from the first height, a third stereoscopic immersive image associated with the first distance between the first camera and the second camera and a fourth stereoscopic immersive image associated with the second distance between the first camera and the second camera; determining body height of the user; determining, whether the first height or the second height is closer to the body height of the user; in the case that the first distance is closer to the interpupillary distance of the user and that the first height is closer to the body height of the user, presenting the first stereoscopic immersive image to the user; in the case that the second distance is closer to the interpupillary distance of the user and that the first height is closer to the body height of the user, presenting the second stereoscopic immersive image to the user; in the case that the first distance is closer to the interpupillary distance of the user and that the second height is closer to the body height of the user, presenting the third stereoscopic immersive image to the user; and in the case that the second distance is closer to the interpupillary distance of the user and that the second height is closer to the body height of the user, presenting the fourth stereoscopic immersive image to the user.

Example 34 is a method for user-specifically presenting an immersive image, the method including: capturing a first stereoscopic immersive image using at least a first camera and a second camera, wherein the first stereoscopic immersive image is associated with a first height of the first camera and the second camera; capturing a second stereoscopic immersive image using at least the first camera and the second camera, wherein the second stereoscopic immersive image is associated with a second height of the first camera and the second camera different from the first height; determining a body height of a user; determining, whether the first height or the second height is closer to the body height of the user; in the case that the first height is closer to the body height of the user, presenting the first stereoscopic immersive image to the user; and in the case that the second height is closer to the body height of the user, presenting the second stereoscopic immersive image to the user.

Example 35 is a (e.g., three-dimensional) camera device for capturing an immersive image, the (e.g., three-dimensional) camera device including: one or more cameras configured to capture an immersive image; a display device configured to display the immersive image or a preview of the immersive image; one or more processors; and one or more orientation sensors (e.g., one or more inertial measurement units) configured to detect an orientation of the (e.g., three-dimensional) camera device and to provide the detected orientation of the (e.g., three-dimensional) camera device to the one or more processors; wherein the one or more processors are configured to: determine an offset value representing an offset of the orientation of the (e.g., three-dimensional) camera device from a horizontal orientation, determine, whether the offset value is equal to or greater than a predefined offset threshold value, and in the case that it is determined that the offset value is equal to or greater than the predefined offset threshold value, control the display device to display a water-scale representing the orientation of the (e.g., three-dimensional) camera device.

Example 36 is a system for capturing an immersive image, the system including: one or more cameras configured to capture a spherical)(360° immersive image; and one or more processors configured to: receive input data representing that a user provided instructions to take a spherical immersive image without the user being shown; responsive to receiving the input data: (e.g., continuously) control the one or more cameras to capture a preview of the spherical immersive image, determine, whether the user is shown in the preview of the spherical immersive image, and in the case that it is determined that the user is not shown in the preview of the spherical immersive image, control the one or more cameras to capture the spherical immersive image.

Example 37 is a (e.g., three-dimensional) camera device for capturing an immersive image, the (e.g., three-dimensional) camera device including: one or more processors; and one or more cameras configured to capture an (e.g., stereoscopic or monoscopic) immersive image having a Fisheye format and to provide the immersive image to the one or more processors; and wherein the one or more processors are configured to: determine, whether the captured immersive image includes at least one object of interest; in the case that it is determined that the captured immersive image includes at least one object of interest, determine, whether, in the case that the captured immersive image having the Fisheye format would be converted into an immersive image having an Equirectangular format, the at least one object would be in a predefined upper region or in a predefined lower region of the immersive image having the Equirectangular format; and in the case that it is determined that the at least one object would be in the predefined upper region or in the predefined lower region of the immersive image having the Equirectangular format, keep the captured immersive image in the Fisheye format or convert the captured immersive image to have a format different from the Equirectangular format.

In Example 38, the subject matter of Example 37 can optionally include that the one or more processors are configured to provide control instructions to store, in a memory device, the immersive image in the Fisheye format or, when converted, in the format different from the Equirectangular format.

Example 39 is a (e.g., three-dimensional) camera device for capturing an immersive image, the (e.g., three-dimensional) camera device including: one or more (e.g., three-dimensional) cameras configured to capture a preview image representing a preview of an immersive image to be captured; a display device configured to display the preview image; one or more eye-tracking cameras configured to detect eye-tracking data representing an eye-viewing direction and a focus depth of a user using the (e.g., three-dimensional) camera device; one or more processors configured to: determine, based on the eye-tracking data, which object within the preview image the user is looking at, and control the one or more (e.g., three-dimensional) cameras to focus on the object the user is looking at.

Example 40 is a system including: one or more (e.g., three-dimensional) cameras configured to capture a preview image representing a preview of an immersive image to be captured; a head-mounted display communicatively connected to the one or more (e.g., three-dimensional) cameras, wherein the head-mounted display includes: a display device configured to display the preview image; one or more eye-tracking cameras configured to detect eye-tracking data representing an eye-viewing direction and/or a focus depth of a user wearing the head-mounted display; one or more processors configured to: determine, based on the eye-tracking data, which object within the preview image the user is looking at, and control the one or more (e.g., three-dimensional) cameras to focus on the object the user is looking at.

Example 41 is a method including: receiving an image from a (e.g., three-dimensional) camera device, the image being an immersive image or a (e.g., two-dimensional or three-dimensional) preview of the immersive image; detecting one or more objects within the image; determining, based on the detected one or more objects, whether a quality of the immersive image can be improved using at least one measure of one or more predefined measures; and in the case that it is determined that the quality of the immersive image can be improved using at least one measure of the one or more predefined measures, providing control instructions to one or more output devices to control the one or more output devices to output information informing a user that the at least one measure can improve the quality when capturing an immersive image.

In Example 42, the subject matter of Example 41 can optionally include that the image is a stereoscopic image including a first image associated with a first lens of the (e.g., three-dimensional) camera device and a second image associated with a second lens of the (e.g., three-dimensional) camera device; and that the method further includes: detecting one or more first objects within the first image and one or more second objects within the second image; determining, by comparing the one or more first objects with the one or more second objects, whether the first image or the second image shows at least one object not shown in the other one; in the case that it is determined that the first image or the second image shows at least one object not shown in the other one, determining that the quality of the immersive image can be improved; determining a type of the at least one object; and determining, based on the type of the at least one object, the at least one measure of one or more predefined measures with which the quality of the immersive image can be improved.

In Example 43, the subject matter of Example 42 can optionally further include: determining a depth map using the stereoscopic image, the depth map including depth information regarding the one or more objects detected within the image; determining, whether the depth map includes an erroneous depth for the at least one object; and in the case that it is determined that the depth map includes an erroneous depth for the at least one object, determining the first image or the second image shows at least one object not shown in the other one.

In Example 44, the method of Example 42 or 43 can optionally further include: determining, whether the at least one object has an ellipsoidal (e.g., circular) shape; in the case that it is determined that the at least one object has an ellipsoidal shape, determining, whether there is color fringing at a border of the at least one object; and in the case that it is determined that the at least one object has an ellipsoidal shape with color fringing at a border of the at least one object, determining a drop of a liquid (e.g., a raindrop) as the type of the at least one object.

In Example 45, the method of Example 44 can optionally further include: in the case that it is determined that the at least one object has an ellipsoidal shape but no color fringing at a border of the at least one object, determining the type of the at least one object to be a dust particle or a fingerprint.

In Example 46, the method of Example 44 or 45 can optionally further include: in the case that it is determined that the first image shows the at least one object not shown in the second image, determining that, as a measure of the one or more predefined measures, the quality of the immersive image can be improved by cleaning the first lens; and in the case that it is determined that the second image shows the at least one object not shown in the first image, determining that, as a measure of the one or more predefined measures, the quality of the immersive image can be improved by cleaning the second lens.

In Example 47, the method of any one of Examples 42 to 46 can optionally further include: determining, whether the at least one object is star-shaped or includes one or more circular rings; in the case that it is determined that the at least one object is star-shaped or includes one or more circular rings, determining a lens flare as the type of the at least one object.

In Example 48, the method of Example 47 can optionally further include: receiving a further stereoscopic image from the (e.g., three-dimensional) camera device, wherein the further stereoscopic image includes a further first image associated with the first lens and a further second image associated with the second lens, wherein the stereoscopic image is associated with a first orientation of the (e.g., three-dimensional) camera device, and wherein the further stereoscopic image is associated with a second orientation of the (e.g., three-dimensional) camera device different from the first orientation (e.g., detected using one or more inertial measurement units); detecting one or more further first objects within the further first image of the further stereoscopic image and one or more further second objects within the further second image of the further stereoscopic image; in the case that it is determined that the first image of the stereoscopic image shows the at least one object not shown in the second image: determining, whether the further first image of the further stereoscopic image shows the at least one object at a different position, and in the case that it is determined that the further first image of the further stereoscopic image shows the at least one object at a different position, determining a lens flare of the first lens as the type of the at least one object; in the case that it is determined that the second image of the stereoscopic image shows the at least one object not shown in the first image: determining, whether the further second image of the further stereoscopic image shows the at least one object at a different position, and in the case that it is determined that the further second image of the further stereoscopic image shows the at least one object at a different position, determining a lens flare of the second lens as the type of the at least one object.

In Example 49, the method of any one of Examples 42 to 48 can optionally further include: determining, whether the at least one object includes one or more lengthy stripes associated with a bright light source; in the case that it is determined that the at least one object includes one or more lengthy stripes associated with a bright light source, determining light rays as the type of the at least one object.

In Example 50, the method of Example 49 can optionally further include: in the case that it is determined that the at least one object includes one or more lengthy stripes associated with a bright light source, determining, whether an object in a surrounding of the at least one object is associated with a sky (e.g., a cloud); and in the case that it is determined that the at least one object includes one or more lengthy stripes associated with a bright light source and that an object in the surrounding of the at least one object is associated with the sky, determining crepuscular rays (god rays) as the type of the at least one object.

In Example 51, the method of Example 50 can optionally further include: in the case that it is determined that the at least one object includes one or more lengthy stripes associated with a bright light source and that no object in the surrounding of the at least one object is associated with the sky, determining reflected sun rays as the type of the at least one object.

In Example 52, the method of any one of Examples 47 to 51 can optionally further include: in the case that lens flare or light rays (e.g., sun rays or god rays) is determined as type of the at least one object, determining that, as a measure of the one or more predefined measures, the quality of the immersive image can be improved by moving and/or rotating the (e.g., three-dimensional) camera device.

In Example 53, the method of any one of Examples 47 to 52 can optionally further include: in the case that lens flare or sun rays is determined as type of the at least one object, determining, whether the one or more objects include a further object which is larger than the at least one object and in a surrounding of the at least one object; in the case that it is determined that the one or more objects include a further object which is larger than the at least one object and in its surrounding, determining that, as a measure of the one or more predefined measures, the quality of the immersive image can be improved by moving the camera such that the further object is located between the (e.g., three-dimensional) camera device and the at least one object.

In Example 54, the method of any one of Examples 42 to 53 can optionally further include: determining, whether the at least one object is close to a corresponding lens of the first lens and the second lens but not directly at the corresponding lens (e.g., the at least one object being an insect or a pollen particle); in the case that it is determined that the at least one object is close to but not at the corresponding lens, determining that, as a measure of the one or more predefined measures, the quality of the immersive image can be improved by capturing the immersive image after a waiting time period and/or by moving the (e.g., three-dimensional) camera device.

In Example 55, the method of any one of Examples 42 to 54 can optionally further include: determining, whether the at least one object is associated with a moving object (e.g., a bird, a plane, a drone, etc.) in a background of the image; and in the case that it is determined that the at least one object is associated with a moving object in the background of the image, determining that, as a measure of the one or more predefined measures, the quality of the immersive image can be improved by capturing the immersive image after a waiting time period.

In Example 56, the method of any one of Examples 42 to 55 can optionally further include: determining, based on a size of the at least one object and/or a one or more color values associated with the at least one object, whether the at least one object is a portion of a finger; and in the case that it is determined that the at least one object is a portion of a finger, determining that, as a measure of the one or more predefined measures, the quality of the immersive image can be improved by removing the finger from the corresponding lens.

In Example 57, the method of any one of Examples 42 to 56 can optionally further include: receiving a plurality of further stereoscopic images from the (e.g., three-dimensional) camera device, each further stereoscopic image of the plurality of further stereoscopic images including a first image associated with the first lens of the (e.g., three-dimensional) camera device and a second image associated with the second lens of the (e.g., three-dimensional) camera device, wherein each stereoscopic image of the plurality of further stereoscopic images is associated with a respective position and/or rotation of the (e.g., three-dimensional) camera device, and wherein the position and/or the rotation varies among stereoscopic image and the plurality of further stereoscopic images; for each further stereoscopic image of the plurality of further stereoscopic images, detecting one or more first objects within the first image and one or more second objects within the second image; determining, whether the first image of the stereoscopic image and one or more (e.g., each) first images of the plurality of further stereoscopic images shows at least one same object at a substantially same position; and in the case that it is determined that the first image of the stereoscopic image and one or more first images of the plurality of further stereoscopic images shows at least one same object at a substantially same position, determining a lens defect of the first lens as the type of the at least one object.

In Example 58, the method of Example 57 can optionally further include: determining, whether the second image of the stereoscopic image and one or more (e.g., each) second images of the plurality of further stereoscopic images shows at least one same object at a substantially same position; and in the case that it is determined that the second image of the stereoscopic image and one or more second images of the plurality of further stereoscopic images shows at least one same object at a substantially same position, determining a lens defect of the second lens as the type of the at least one object.

In Example 59, the method of Example 58 can optionally further include: in the case that a lens defect of the first lens is determined as the type of the at least one object, determining that, as a measure of the one or more predefined measures, the quality of the immersive image can be improved by repairing and/or replacing the first lens; and/or in the case that a lens defect of the second lens is determined as the type of the at least one object, determining that, as a measure of the one or more predefined measures, the quality of the immersive image can be improved by repairing and/or replacing the second lens.

In Example 60, the subject matter of any one of Examples 42 to 59 can optionally include that determining, whether the first image or the second image shows at least one object not shown in the other one includes determining a respective difference for each pixel of the first image and the second image, wherein determining a difference of a respective pixel between the first image and the second image includes: determining a difference between a color value of the respective pixel in the first image and a color value of the respective pixel in the second image, and in the case that the difference between the color value of the respective pixel in the first image and the color value of the respective pixel in the second image is equal to or greater than a predefined color threshold value, determine that the first image or the second image shows at least one object not shown in the other one.

In Example 61, the method of any one of Examples 41 to 60 can optionally further include: determining a depth map using the stereoscopic image, the depth map including depth information regarding the one or more objects detected within the image.

In Example 62, the method of Example 61 can optionally further include: determining, using the depth map (and optionally an interpupillary distance of the user), whether each object of the one or more objects has a distance to the (e.g., three-dimensional) camera device equal to or greater than a predefined minimum distance value; and in the case that it is determined that at least one object of the one or more objects has a distance to the (e.g., three-dimensional) camera device less than the predefined minimum distance value, determining that, as a measure of the one or more predefined measures, the quality of the immersive image can be improved by moving the (e.g., three-dimensional) camera device further away from the at least one object.

In Example 63, the method of Example 61 or 62 can optionally further include: determining, using the depth map (and optionally an interpupillary distance of the user), for each object of the one or more objects a respective distance to the (e.g., three-dimensional) camera device; determining a distance difference between a distance associated with an object of the one or more objects furthest away from the (e.g., three-dimensional) camera device and a distance associated with an object of the one or more objects closest to the (e.g., three-dimensional) camera device; determining, whether the distance difference is greater than a predefined upper distance threshold value; and in the case that it is determined that the distance difference is greater than the predefined upper distance threshold value, determining that, as a measure of the one or more predefined measures, the quality of the immersive image can be improved by moving the (e.g., three-dimensional) camera device.

In Example 64, the method of Example 63 can optionally further include: determining, whether the distance difference is equal to or less than a predefined lower distance threshold value; and in the case that it is determined that the distance difference is equal to or less than the predefined lower distance threshold value, determining that, as a measure of the one or more predefined measures, the quality of the immersive image can be improved by moving the (e.g., three-dimensional) camera device to increase the overall depth variation.

In Example 65, the subject matter of any one of Examples 41 to 64 can optionally include that detecting the one or more objects within the image includes detecting the one or more objects within the image using semantic image segmentation.

In Example 66, the subject matter of Examples 42 and 65 can optionally include that determining the type of the at least one object includes determining the type of the at least one object using the semantic image segmentation.

In Example 67, the method of Example 66 can optionally further include: determining, whether at least one object of the one or more objects is associated with a predefined object of interest (e.g., a person, a face of a person, etc.); in the case that it is determined that at least one object of the one or more objects is associated with a predefined object of interest, determining, whether the at least object is located in a center portion of the image; and in the case that it is determined that the at least object is not located in the center portion of the image, determining that, as a measure of the one or more predefined measures, the quality of the immersive image can be improved by moving the (e.g., three-dimensional) camera device such that the at least one object is located in the center portion of the image.

In Example 68, the method of any one of Examples 41 to 67 can optionally further include: determining, whether at least one object of the one or more objects is associated with a reflection (e.g., a specular highlight); and in the case that it is determined that at least one object of the one or more objects is associated with a reflection, determining that, as a measure of the one or more predefined measures, the quality of the immersive image can be improved by moving (e.g., three-dimensional) camera device.

In Example 69, the method of any one of Examples 41 to 68 can optionally further include: determining, whether at least one object of the one or more objects is associated with a Moiré effect; and in the case that it is determined that at least one object of the one or more objects is associated with a Moiré effect, determining that, as a measure of the one or more predefined measures, the quality of the immersive image can be improved by moving further away from or closer to the at least one object and/or by moving to change an angle to the at least one object.

In Example 70, the method of any one of Examples 41 to 69 can optionally further include: determining, whether at least one object of the one or more objects is associated with a tripod; and in the case that it is determined that at least one object of the one or more objects is associated with a tripod, determining that, as a measure of the one or more predefined measures, the quality of the immersive image can be improved by changing to a setup in which no tripod is visible when capturing an immersive image.

In Example 71, the subject matter of any one of Examples 41 to 70 can optionally include that the immersive image is a spherical immersive image which include a first half-spherical immersive image having a Fisheye format and a second half-spherical immersive image having the Fisheye format; wherein the method further includes: determining, whether there is at least one object of the one or more objects of which a first portion is shown in the first half-spherical immersive image and a second portion is shown in the second half-spherical immersive image; in the case that it is determined that there is at least one object of which a first portion is shown in the first half-spherical immersive image and a second portion is shown in the second half-spherical immersive image, determine, whether the at least one object is associated with a face or with written text; and in the case it is determined that the at least one object is associated with a face or with written text, determining that, as a measure of the one or more predefined measures, the quality of the immersive image can be improved by rotating the (e.g., three-dimensional) camera device such that the at least one object is completely within the first half-spherical immersive image or the second half-spherical immersive image.

Example 72 is a method for capturing an immersive image, the method including: capturing a preview image using a (e.g., three-dimensional) camera device, the preview image representing a preview of an immersive image to be captured; detecting an orientation of the (e.g., three-dimensional) camera device; determining an offset value representing an offset of the orientation of the (e.g., three-dimensional) camera device from a horizontal orientation (e.g., horizontal alignment); determining, whether the offset value is equal to or greater than a predefined offset threshold value; and in the case that it is determined that the offset value is equal to or greater than the predefined offset threshold value, displaying a water-scale on a display of the (e.g., three-dimensional) camera device, the water-scale representing the orientation of the (e.g., three-dimensional) camera device.

Example 73 is a method for capturing an immersive image, the method including: receiving input data representing that a user provided instructions to take a spherical immersive image without the user being shown; responsive to receiving the input data: (e.g., continuously) capturing a preview image (e.g., a continuous preview image stream) representing a preview of the spherical immersive image to be taken, determining, whether the user is shown in the preview image, and in the case that it is determined that the user is not shown in the preview image, capturing the spherical immersive image.

Example 74 is a method for capturing an immersive image, the method including: capturing an immersive image having a Fisheye format; determining, whether the immersive image includes at least one object of interest; in the case that it is determined that the immersive image includes at least one object of interest, determining, whether, in the case that the captured immersive image having the Fisheye format would be converted into an immersive image having an Equirectangular format, the at least one object would be in a predefined upper region or in a predefined lower region of the immersive image having the Equirectangular format; and in the case that it is determined that the at least one object would be in the predefined upper region or in the predefined lower region of the immersive image having the Equirectangular format, keeping the immersive image in the Fisheye format or converting the immersive image into another format different from the Equirectangular format.

In Example 75, the method of Example 75 can optionally further include: storing the immersive image in the Fisheye format or, when converted, in the other format different from the Equirectangular format in a memory device.

Example 76 is a method for capturing an immersive image, the method including: displaying a preview image representing a preview of an immersive image to be captured; detect eye-tracking data representing an eye-viewing direction and a focus depth of a user looking at the preview image; determining, based on the eye-tracking data, which object within the preview image the user is looking at, and focusing on the object the user is looking at.

Example 77 is a non-transitory computer-readable medium having instructions recorded thereon which, when executed by one or more processors, cause the one or more processors to carry out the method according to any one of Examples 32 to 34 and/or any one of Examples 42 to 76.

Example 78 is a system, including: the device according to any one of Examples 1 to 31; and the camera device, wherein the camera device includes one or more cameras configured to capture the immersive image.

In Example 79, the system of Example 78 can optionally include that the camera device includes: a display device configured to display the immersive image or a preview of the immersive image; and one or more orientation sensors configured to detect an orientation of the camera device and to provide the detected orientation of the camera device to the one or more processors; wherein the one or more processors of the device are configured to: determine an offset value representing an offset of the orientation of the camera device from a horizontal orientation, determine, whether the offset value is equal to or greater than a predefined offset threshold value, and in the case that it is determined that the offset value is equal to or greater than the predefined offset threshold value, control the display device to display a water-scale representing the orientation of the camera device.

In Example 80, the system of Example 78 or 79 can optionally include that the immersive image is a spherical immersive image; and that the one or more processors of the device are configured to: receive input data representing that a user provided instructions to take a spherical immersive image without the user being shown; responsive to receiving the input data: control the one or more cameras to capture a preview of the spherical immersive image, determine, whether the user is shown in the preview of the spherical immersive image, and in the case that it is determined that the user is not shown in the preview of the spherical immersive image, control the one or more cameras to capture the spherical immersive image.

In Example 81, the system of any one of Examples 78 to 80 can optionally include that the one or more cameras configured to capture an immersive image having a Fisheye format and to provide the immersive image to the one or more processors; and that the one or more processors are configured to: determine, whether the captured immersive image includes at least one object of interest; in the case that it is determined that the captured immersive image includes at least one object of interest, determine, whether, in the case that the captured immersive image having the Fisheye format would be converted into an immersive image having an Equirectangular format, the at least one object would be in a predefined upper region or in a predefined lower region of the immersive image having the Equirectangular format; and in the case that it is determined that the at least one object would be in the predefined upper region or in the predefined lower region of the immersive image having the Equirectangular format, keep the captured immersive image in the Fisheye format or convert the captured immersive image to have a format different from the Equirectangular format.

In Example 82, the system of any one of Examples 78 to 81 can optionally include that the one or more cameras are one or more three-dimensional cameras configured to capture a preview image representing a preview of an immersive image to be captured; and that the camera device further includes: a display device configured to display the preview image; one or more eye-tracking cameras configured to detect eye-tracking data representing an eye-viewing direction and a focus depth of a user using the three-dimensional camera device; wherein the one or more processors of the device are configured to: determine, based on the eye-tracking data, which object within the preview image the user is looking at, and control the one or more three-dimensional cameras to focus on the object the user is looking at.

In Example 83, the system of any one of Examples 78 to 82 can optionally include that the one or more cameras are one or more three-dimensional cameras configured to capture a preview image representing a preview of the immersive image to be captured; and that the system further includes a head-mounted display communicatively connected to the one or more three-dimensional cameras, wherein the head-mounted display includes: a display device configured to display the preview image; one or more eye-tracking cameras configured to detect eye-tracking data representing an eye-viewing direction and a focus depth of a user wearing the head-mounted display; wherein the one or more processors of the device are configured to: determine, based on the eye-tracking data, which object within the preview image the user is looking at, and control the one or more three-dimensional cameras to focus on the object the user is looking at.

In Example 84, the system of any one of Examples 78 to 83 can optionally include that the camera device includes the device.

Various aspects refer to an assistance scheme (e.g., an automatic guidance) which can improve the quality of immersive images when capturing them. This may increase an experience across the population for creating 3D, 180° 2D/3D, 360° 2D/3D content. With this, the market for 3D and VR cameras may thrive faster. Users may be less frustrated and capture more media as they are happier with the results.

Although the disclosure refers to immersive images, it is understood that various aspects of the above described assistance principles may analogously apply to (two-dimensional) perspective images as well. Hence, some of the above described assistance principles may be implemented in a device and/or system for capturing perspective images.

Although the disclosure refers taking immersive images using a (e.g., 3D) camera device, the above described assistance principles may analogously apply to taking a screenshot or a video of computer-simulated content inside a computer-simulated environment (e.g., when using a head-mounted display). The computer-simulated environment may be an image-viewing environment, a video-viewing environment, a gaming environment, etc.

What is claimed is:

1. A device, comprising:

one or more processors configured to:

receive an image from a camera device, the image being an immersive image or a preview of the immersive image;

detect one or more objects within the image;

determine, based on the detected one or more objects, whether a quality of the immersive image can be improved using at least one measure of one or more predefined measures; and in the case that it is determined that the quality of the immersive image can be improved using at least one measure of the one or more predefined measures, provide control instructions to one or more output devices to control the one or more output devices to output information informing a user that the at least one measure can improve the quality when capturing an immersive image, wherein the image is a stereoscopic image comprising a first image associated with a first lens of the camera device and a second image associated with a second lens of the camera device; and wherein the one or more processors configured to:

detect one or more first objects within the first image and one or more second objects within the second image;

determine, by comparing the one or more first objects with the one or more second objects, whether the first image or the second image shows at least one object not shown in the other one;

in the case that it is determined that the first image or the second image shows at least one object not shown in the other one, determine that the quality of the immersive image can be improved;

determine a type of the at least one object; and determine, based on the type of the at least one object, the at least one measure of one or more predefined measures with which the quality of the immersive image can be improved, wherein the one or more processors are configured to:

determine, whether the at least one object has an ellipsoidal shape;

in the case that it is determined that the at least one object has an ellipsoidal shape, determine, whether there is color fringing at a border of the at least one object; and in the case that it is determined that the at least one object has an ellipsoidal shape with color fringing at a border of the at least one object, determine a drop of a liquid as the type of the at least one object.

2. The device according to claim 1, wherein the one or more processors are configured to:

determine a depth map using the stereoscopic image, the depth map comprising depth information regarding the one or more objects detected within the image;

determine, whether the depth map comprises an erroneous depth for the at least one object; and in the case that it is determined that the depth map comprises an erroneous depth for the at least one object, determine the first image or the second image shows at least one object not shown in the other one.

3. The device according to claim 1, wherein the one or more processors are configured to:

in the case that it is determined that the at least one object has an ellipsoidal shape but no color fringing at a border of the at least one object, determine the type of the at least one object to be a dust particle or a fingerprint.

4. The device according to claim 1, wherein the one or more processors are configured to:

in the case that it is determined that the first image shows the at least one object not shown in the second image, determine that, as a measure of the one or more predefined measures, the quality of the immersive image can be improved by cleaning the first lens; and/or in the case that it is determined that the second image shows the at least one object not shown in the first image, determine that, as a measure of the one or more predefined measures, the quality of the immersive image can be improved by cleaning the second lens.

5. The device according to claim 1, wherein the one or more processors are configured to:

determine, whether the at least one object is star-shaped or comprises one or more circular rings;

in the case that it is determined that the at least one object is star-shaped or comprises one or more circular rings, determine a lens flare as the type of the at least one object.

6. The device according to claim 1, wherein the one or more processors are configured to:

receive a plurality of further stereoscopic images from the camera device, each further stereoscopic image of the plurality of further stereoscopic images comprising a first image associated with the first lens of the camera device and a second image associated with the second lens of the camera device, wherein each stereoscopic image of the plurality of further stereoscopic images is associated with a respective position and/or rotation of the camera device, and wherein the position and/or the rotation varies among stereoscopic image and the plurality of further stereoscopic images;

for each further stereoscopic image of the plurality of further stereoscopic images, detect one or more first objects within the first image and one or more second objects within the second image;

determine, whether the first image of the stereoscopic image and one or more first images of the plurality of further stereoscopic images shows at least one same object at a substantially same position; and in the case that it is determined that the first image of the stereoscopic image and one or more first images of the plurality of further stereoscopic images shows at least one same object at a substantially same position, determine a lens defect of the first lens as the type of the at least one object.

7. The device according to claim 1, wherein the one or more processors are configured to:

determine a depth map using the stereoscopic image, the depth map comprising depth information regarding the one or more objects detected within the image;

determine, using the depth map, for each object of the one or more objects a respective distance to the camera device;

determine a distance difference between a distance associated with an object of the one or more objects furthest away from the camera device and a distance associated with an object of the one or more objects closest to the camera device;

determine, whether the distance difference is greater than a predefined upper distance threshold value; and in the case that it is determined that the distance difference is greater than the predefined upper distance threshold value, determine that, as a measure of the one or more predefined measures, the quality of the immersive image can be improved by moving the camera.

8. The device according to claim 1, wherein the image is a spherical immersive image which comprise a first half-spherical immersive image having a Fisheye format and a second half-spherical immersive image having the Fisheye format;

wherein the one or more processors are configured to:

determine, whether there is at least one object of the one or more objects of which a first portion is shown in the first half-spherical immersive image and a second portion is shown in the second half-spherical immersive image;

in the case that it is determined that there is at least one object of which a first portion is shown in the first half-spherical immersive image and a second portion is shown in the second half-spherical immersive image, determine, whether the at least one object is associated with a face or with written text; and in the case it is determined that the at least one object is associated with a face or with written text, determine that, as a measure of the one or more predefined measures, the quality of the immersive image can be improved by rotating the camera device such that the at least one object is completely within the first half-spherical immersive image or the second half-spherical immersive image.

9. The device according to claim 1, wherein the one or more processors are configured to: determine the type of the at least one object using the semantic image segmentation; determine, whether at least one object of the one or more objects is associated with a predefined object of interest; in the case that it is determined that at least one object of the one or more objects is associated with a predefined object of interest, determine, whether the at least object is located in a center portion of the image; and in the case that it is determined that the at least object is not located in the center portion of the image, determine that, as a measure of the one or more predefined measures, the quality of the immersive image can be improved by moving the camera device such that the at least one object is located in the center portion of the image.

10. The device according to claim 1, wherein the one or more processors are configured to:

determine whether at least one object of the one or more objects is associated with a Moiré effect; and in the case that it is determined that at least one object of the one or more objects is associated with a Moiré effect, determine that, as a measure of the one or more predefined measures, the quality of the immersive image can be improved by moving further away from or closer to the at least one object and/or by moving to change an angle to the at least one object.

11. The device according to claim 1, wherein the one or more processors are configured to:

determine, whether at least one object of the one or more objects is associated with a tripod; and in the case that it is determined that at least one object of the one or more objects is associated with a tripod, determine that, as a measure of the one or more predefined measures, the quality of the immersive image can be improved by changing to a setup in which no tripod is visible when capturing an immersive image.

12. A system, comprising:

a device; and a camera device, wherein the camera device comprises one or more cameras configured to capture an immersive image;

wherein the device comprises one or more processors configured to:

receive an image from the camera device, the image being the immersive image or a preview of the immersive image, detect one or more objects within the image, determine, based on the detected one or more objects, whether a quality of the immersive image can be improved using at least one measure of one or more predefined measures, and in the case that it is determined that the quality of the immersive image can be improved using at least one measure of the one or more predefined measures, provide control instructions to one or more output devices to control the one or more output devices to output information informing a user that the at least one measure can improve the quality when capturing an immersive image, wherein the immersive image is a spherical immersive image; and wherein the one or more processors of the device are configured to:

receive input data representing that a user provided instructions to take a spherical immersive image without the user being shown;

responsive to receiving the input data:

control the one or more cameras to capture a preview of the spherical immersive image, determine, whether the user is shown in the preview of the spherical immersive image, and in the case that it is determined that the user is not shown in the preview of the spherical immersive image, control the one or more cameras to capture the spherical immersive image.

13. The system according to claim 12, wherein the camera device comprises:

a display device configured to display the immersive image or a preview of the immersive image; and one or more orientation sensors configured to detect an orientation of the camera device and to provide the detected orientation of the camera device to the one or more processors;

wherein the one or more processors of the device are configured to:

determine an offset value representing an offset of the orientation of the camera device from a horizontal orientation, determine, whether the offset value is equal to or greater than a predefined offset threshold value, and in the case that it is determined that the offset value is equal to or greater than the predefined offset threshold value, control the display device to display a water-scale representing the orientation of the camera device.

14. The system according to claim 12, wherein the immersive image has a Fisheye format; and wherein the one or more processors are configured to:

determine, whether the captured immersive image comprises at least one object of interest;

in the case that it is determined that the captured immersive image comprises at least one object of interest, determine, whether, in the case that the captured immersive image having the Fisheye format would be converted into an immersive image having an Equirectangular format, the at least one object would be in a predefined upper region or in a predefined lower region of the immersive image having the Equirectangular format; and in the case that it is determined that the at least one object would be in the predefined upper region or in the predefined lower region of the immersive image having the Equirectangular format, keep the captured immersive image in the Fisheye format or convert the captured immersive image to have a format different from the Equirectangular format.

15. The system according to claim 12, wherein the one or more cameras are configured to capture a preview image representing a preview of the immersive image to be captured;

wherein the camera device further comprises: a display device configured to display the preview image, and one or more eye-tracking cameras configured to detect eye-tracking data representing an eye-viewing direction and a focus depth of a user using the camera device; and wherein the one or more processors are configured to:

determine, based on the eye-tracking data, which object within the preview image the user is looking at, and control the one or more cameras to focus on the object the user is looking at.

16. The system according to claim 12, wherein the one or more cameras are configured to capture a preview image representing a preview of the immersive image to be captured;

wherein the system further comprises a head-mounted display communicatively connected to the one or more three-dimensional cameras, wherein the head-mounted display comprises:

a display device configured to display the preview image;

one or more eye-tracking cameras configured to detect eye-tracking data representing an eye-viewing direction and a focus depth of a user wearing the head-mounted display;

wherein the one or more processors of the device are configured to:

determine, based on the eye-tracking data, which object within the preview image the user is looking at, and control the one or more cameras to focus on the object the user is looking at.

* * * * *